United States Patent [19]
Ando et al.

[11] Patent Number: 5,639,518
[45] Date of Patent: Jun. 17, 1997

[54] METHOD FOR MANUFACTURING BIODEGRADABLE MOLDED ARTICLES

[75] Inventors: Sadamasa Ando, Minoo; Taizo Karasawa, Ibaraki; Akio Ozasa, Kyoto; Takayuki Kurisaka, Yawata; Yoshiyuki Otani, Ibaraki, all of Japan

[73] Assignee: Nissei Kabushiki Kaisha, Osaka, Japan

[21] Appl. No.: 501,231

[22] Filed: Jul. 11, 1995

[30] Foreign Application Priority Data

Jul. 11, 1994 [JP] Japan .................. 6-158471
Jul. 3, 1995 [JP] Japan .................. 7-167749

[51] Int. Cl.⁶ .................................. B05D 3/06
[52] U.S. Cl. .................. 427/544; 99/451; 219/771; 264/450; 264/451; 264/472; 426/244; 426/245; 427/591
[58] Field of Search .................. 426/244, 245; 99/451, 358; 264/51, 53, 472, 474, 425, 476, 450, 451; 422/22; 427/591; 219/771

[56] References Cited

U.S. PATENT DOCUMENTS

| | | | |
|---|---|---|---|
| 4,056,638 | 11/1977 | Huang et al. | 426/244 |
| 4,076,846 | 2/1978 | Nakatsuka et al. | 426/62 |
| 4,522,834 | 6/1985 | Miyahara | 426/244 X |
| 4,673,438 | 6/1987 | Wittwer et al. | 106/126 |
| 4,737,582 | 4/1988 | Goldman et al. | 536/2 |
| 5,035,930 | 7/1991 | Lacourse et al. | 428/35.6 |
| 5,046,730 | 9/1991 | Golden et al. | 273/33 |
| 5,153,037 | 10/1992 | Altieri | 428/35.6 |
| 5,160,368 | 11/1992 | Begovich | 106/154.1 |
| 5,208,267 | 5/1993 | Neumann et al. | 521/79 |
| 5,470,382 | 11/1995 | Andou | 106/124 |

FOREIGN PATENT DOCUMENTS

| | | |
|---|---|---|
| 3937168 | 5/1991 | Germany . |
| 4009408 | 9/1991 | Germany . |
| 2-67109 | 3/1990 | Japan . |
| 2-45885 | 10/1990 | Japan . |
| 2190093 | 11/1987 | United Kingdom . |

OTHER PUBLICATIONS

Food Science, Fourth Edition, "Sources of Fats and Oils" by Norman N. Potter, pp. 447–450, Dept. of Food Science, Cornell University, Ithaca, N.Y., 1986.

Handbook of Starch Science, "The Residues Resulting from Producing Starch" published by Asakura Shoten in 1979, pp. 304 and 320, 1979.

Handbook of Chemistry, "The Residues Resulting from Removing Oil from Soybean, Corn and Rapeseed" published by Maruzen Co., Ltd. in 1984.

*Primary Examiner*—Michael Lusignan
*Attorney, Agent, or Firm*—Jordan and Hamburg

[57] ABSTRACT

A raw material formed by a mixture of, for example, soybean protein and water, is extruded by an extruder. Then, high-frequency electroconductive heating is performed by placing the material between a pair of electrodes and applying a voltage between the electrodes. As a result, a biodegradable molded article is obtained. In this method, biodegradable molded articles having a uniform structure are manufactured in a short period of time without increasing the cost of equipment or adversely affecting the working environment.

39 Claims, 4 Drawing Sheets

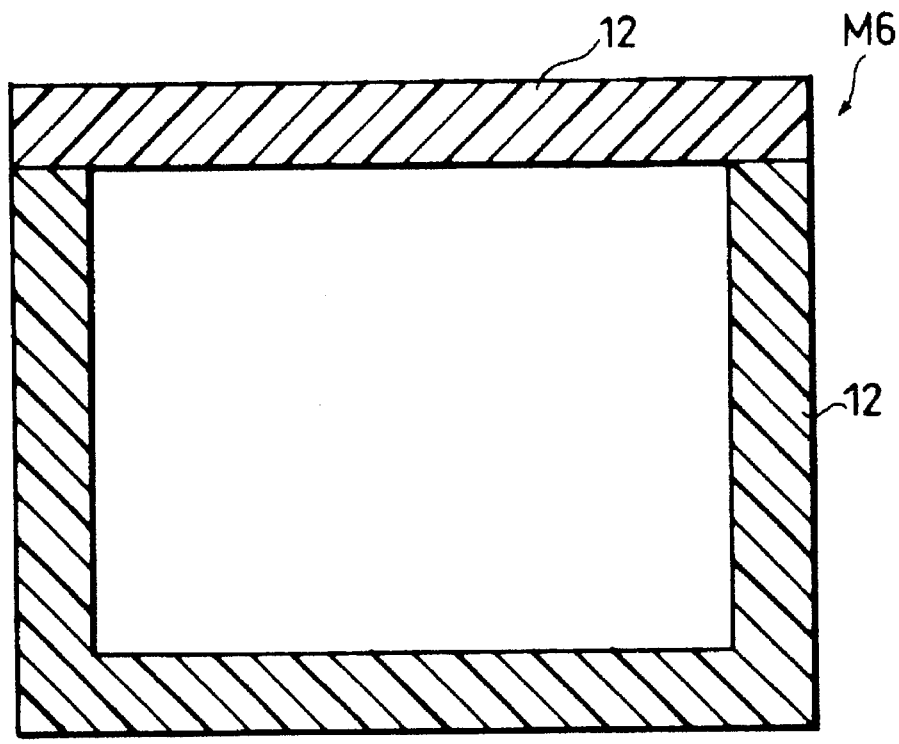
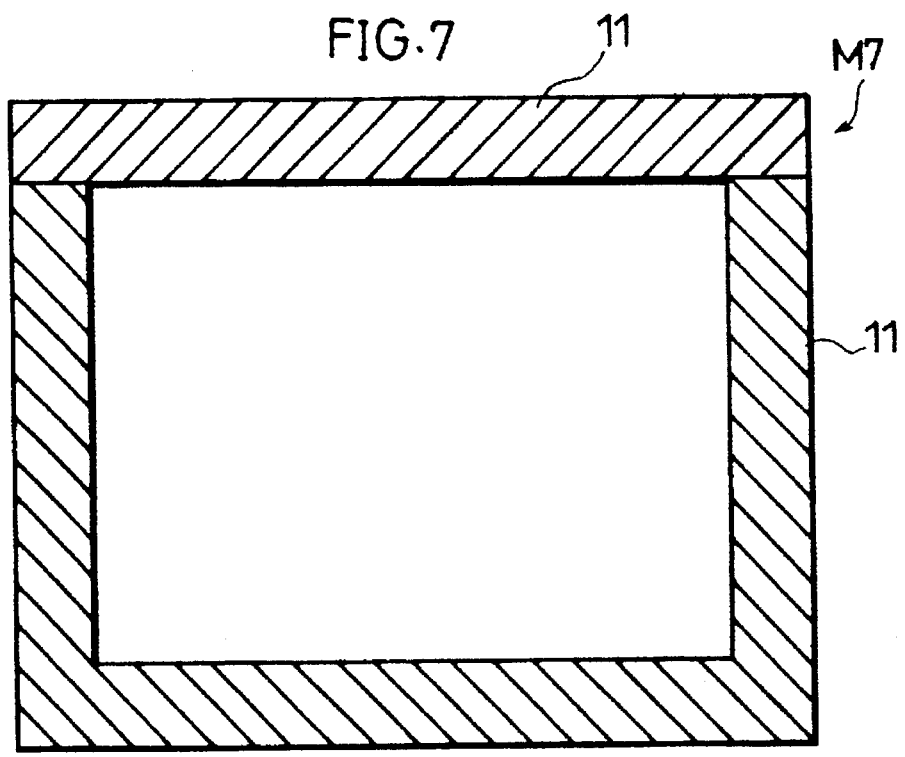

METHOD FOR MANUFACTURING BIODEGRADABLE MOLDED ARTICLES

BACKGROUND OF THE INVENTION

The present invention relates to a method for manufacturing biodegradable molded articles which are decomposable by bacteria, microbes, etc. in the soil.

Plastics are generally used as materials for molded articles such as containers, packaging materials, etc. However, the plastics have the following disadvantages which give rise to problems in their waste treatment after use. In such molded plastics, the biodegradability thereof is extremely low and sometimes a toxic gas is generated when they are incinerated. Thus, the disposal (burying, incinerating, composting, etc.) of plastics has caused serious social and environmental problems.

Recently, in place of such plastics use has been made of biodegradable molded articles (hereinafter simply referred to as the molded articles) which can be decomposed by bacteria, microbes, etc. in the soil. The molded articles which are made from biodegradable materials. When such molded articles are buried in the soil, they are easily decomposed as mentioned above, thereby eliminating the problem associated with the waste disposal of the conventional molded articles made from plastics. Moreover, it is safe to use such molded articles, for example, as containers for foods.

Conventionally, the biodegradable molded articles are manufactured by placing biodegradable raw materials in a mold heated beforehand to a predetermined temperature, by application of conventional thermal conductive heating. In an alternative method, the biodegradable molded articles are formed in any desired shapes with an application of pressure by means of a high pressure press.

However, the above-noted conventional heating process has the following problems:

1) From the heated mold, heat is dissipated not only to the materials placed in the mold to be heated, but also into the atmosphere surrounding the mold, thereby resulting in poor energy efficiency.

2) Furthermore, because of this excess heat dissipation, the temperature of the atmosphere surrounding the manufacturing device increases, thereby resulting in an unfavorable working environment.

3) Since a long time is required for entirely transferring heat to the materials to be molded which are placed in the mold, it is difficult to complete the molding process in a short time, thereby resulting in low productivity.

4) In order to complete the process more quickly, the mold can be heated beforehand to a higher temperature. However, as a result, a great difference in temperature arises between the surface portion and the inside portion of the material to be molded, thereby presenting the resulting in a non-homogeneous structure of the molded articles.

5) Further, since the mold must be heated to a predetermined temperature beforehand, excess energy as well as time is required.

On the other hand, for example, the alternative method employing compression molding by means of a high-pressure press has the following problems:

1) The device itself is larger in size, and large-scale production facilities are required.

2) Loud noise and great vibrations occur in the manufacturing process, thereby resulting in an unfavorable working environment.

3) Since the method using a high-pressure press is dangerous, special care must be taken during its operation.

SUMMARY OF THE INVENTION

An objective of the present invention is to provide a method for manufacturing biodegradable molded articles, which is capable of carrying out mass production of quality molded articles with an improved energy efficiency in a shorter time without resulting in an unfavorable working environment or high costs for equipment, such as a large-scale apparatus.

In order to achieve the above objective, the first method for manufacturing biodegradable molded articles in accordance with the present invention is characterized by application of high-frequency electroconductive heating and/or high-frequency dielectric heating to a biodegradable material.

In electroconductive heating, an object is placed between and in contact with electrodes to which a suitable voltage is applied. Then, heat is generated throughout the entire object by applying an electric current to the object directly through the electrodes. Thus, the temperature of the object is rapidly and uniformly increased by this heat generation. Electroconductive heating is classified into two types, high-frequency electroconductive heating which usually uses a current having a frequency in the range of from 100 kHz to several MHz and low-frequency electroconductive heating which usually uses a current having a frequency not higher than 100 kHz.

In dielectric heating, an object is placed in a high-frequency electric field, and heat generation is caused in the object by dielectric loss of the object in this electric field. High-frequency dielectric heating usually uses an electric field having a frequency specified as an ISM (Industrial, Scientific and Medical use) band among frequencies between several MHz and several tens GHz.

With the first method, biodegradable molded articles which do not require a complicated process for their disposal are efficiently manufactured by the application of high-frequency electroconductive heating and/or high-frequency dielectric heating without resulting in an unfavorable working environment. Namely, by applying high-frequency electroconductive heating and/or high-frequency dielectric heating to the biodegradable material, the heat is generated in the biodegradable material itself. Thus, this method is superior to conventional thermal conductive heating and has the following advantages:

1) Since the heat is generated in the heated object itself, the energy efficiency is extremely good and the excess heat dissipation in the surrounding area is very small.

2) Since an excess of heat dissipation is small, an increase in the temperature of the surrounding atmosphere of the manufacturing device is relatively small, thereby producing no vicious effects on the working environment.

3) Since the heat is generated in the heated object itself, the heating process is completed in a shorter time.

4) Since the heat is uniformly generated in the entire heated object, variations in the temperature are unlikely to occur in heating, thereby producing a molded article with a uniform structure.

5) Since there is no need to heat the mold in advance, excessive energy and time are not required.

6) Even in the case where the mold needs to be heated since the heat is generated in the material itself, the temperature of the mold is not decreased, resulting in good energy efficiency.

Compared to compression molding, for example, high-frequency electroconductive heating and/or high-frequency dielectric heating has the following advantages.

1) Since a large-scale apparatus is not required, the cost of equipment is reduced.

2) Since noise and vibration are not produced, the working environment is not adversely affected.

It is thus possible to provide a method for manufacturing quality biodegradable molded articles with improved energy efficiency in a shorter time and in mass-production without resulting in an unfavorable working environment or high costs for equipment, such as, a large-scale apparatus.

The second method for manufacturing biodegradable molded articles is based on the first method, and is characterized by application of low-frequency electroconductive heating.

In the second method, low-frequency electroconductive heating is used as well as high-frequency electroconductive heating and/or high-frequency dielectric heating. It is therefore possible to design a desired process using the following advantages of each heating method.

Low-frequency electroconductive heating has the advantage of uniformly heating the entire material in a shorter time particularly, for example, when the moisture content of the material is relatively high. On the other hand, high-frequency electroconductive heating and high-frequency dielectric heating have the advantages of uniformly heating the entire material in a shorter time particularly, for example, when the moisture content of the material is low.

For example, when molding a material with a relatively high moisture content, the material itself is first uniformly heated using low-frequency electroconductive heating. Then, when the moisture content of the material is lowered, the material is uniformly heated using high-frequency electroconductive heating and/or high-frequency dielectric heating. It is thus possible to produce a molded article in a shorter time compared with the case where low-frequency electroconductive heating, high-frequency electroconductive heating or high-frequency dielectric heating is used alone.

By using both the advantages of high-frequency electroconductive heating and/or high-frequency dielectric heating and of low-frequency electroconductive heating, it is possible to provide a manufacturing method capable of mass-producing quality biodegradable molded articles with further improved energy efficiency in a further reduced time.

Moreover, when it is required to adjust the moisture content after molding depending on the characteristics and purposes of the molded articles, it is possible to make fine adjustments of the moisture content of raw materials. For example, when performing an adjustment so that the final product has a relatively high moisture content, high-frequency electroconductive heating or high-frequency dielectric heating is used at the final step of the manufacturing process. When performing an adjustment so that the final product has a relatively low moisture content, low-frequency electroconductive heating is used, for example, at the final step of the manufacturing process.

This is used as effective means when performing fine adjustments which are required in imparting necessary properties to molded articles during manufacturing.

The above-mentioned procedure is merely an example, and the effects of using low-frequency electroconductive heating in combination with high-frequency electroconductive heating and/or high-frequency dielectric heating are obtained by suitably combining the respective processes depending on various raw materials and the characteristics of demanded molded articles. Some examples of the combination of the heating methods are shown below:

1) Low-frequency electroconductive heating and high-frequency electroconductive heating are successively performed.

2) Low-frequency electroconductive heating and high-frequency dielectric heating are successively performed.

3) High-frequency electroconductive heating and low-frequency electroconductive heating are successively performed.

4) High-frequency dielectric heating and low-frequency electroconductive heating are successively performed.

5) Low-frequency electroconductive heating, high-frequency electroconductive heating, and high-frequency dielectric heating are successively performed.

6) Low-frequency electroconductive heating, high-frequency dielectric heating, and high-frequency electroconductive heating are successively performed.

7) High-frequency electroconductive heating, high-frequency dielectric heating, and low-frequency electroconductive heating are successively performed.

8) High-frequency dielectric heating, high-frequency electroconductive heating, and low-frequency electroconductive heating are successively performed.

The third method for manufacturing biodegradable molded articles is based on the first or second method, and is characterized by using an extruder.

Extrusion is generally used for molding thermoplastic resins in the industry, and is also generally used in food industry. Extrusion is a technique whereby a material placed into a cylinder, having a screw therein is mixed, kneaded, sheared, compressed, heated, expanded, and so on by rotating the screw. With the extruding technique, it is possible to continuously perform two or more types of independent operations such as compressing, mixing, kneading, shearing, heating, and expanding simultaneously within a short time by placing the material in the cylinder installed in an extruder, rotating the screw and through extruding the material from a die. It is thus possible to design an effective method for manufacturing biodegradable molded articles by using this technique, depending on the manufacturing conditions of the biodegradable molded articles and desired characteristics of final products. For example, by using extrusion (to prepare raw materials) before molding, it is possible to prepare the material in shorter time, than by a conventional mixing method, and to prepare the material continuously. It is thus possible to design a more effective manufacturing process of biodegradable molded articles. Furthermore, when the moisture content of the final product is low, it is possible to further decrease the molding time and to perform molding with improved efficiency by reducing the moisture content of the raw material before it is heated, because the moisture to be removed is reduced. In this case, in the preparation of a raw material having a low moisture content, it is difficult to prepare a homogeneous material having a low moisture content by only using the conventional mixing method. Extrusion can also be used as an effective method in such a case.

When using extrusion in the first method, a target biodegradable molded article is produced by heating an object removed from the extruder by the above-mentioned high-frequency electroconductive heating. It is also possible to employ a method using high-frequency dielectric heating instead of high-frequency electroconductive heating, a method in which high-frequency dielectric heating is performed after high-frequency electroconductive heating, or a method in which high-frequency electroconductive heating is performed after high-frequency dielectric heating. Alternatively, it is possible to perform low-frequency electroconductive heating in combination with these methods.

As described above, by using extrusion in the first and second methods for manufacturing biodegradable molded articles, both the advantages of electromagnetic heating and of extrusion are realized for the manufacture of biodegradable molded articles.

It is therefore possible to provide a method capable of mass-producing quality molded articles in a further reduced time with further improved energy efficiency.

The molded articles manufactured by the above-mentioned methods are applicable to a wide variety of areas. Some examples of such applications of the molded articles are: food containers for hamburgers, hot dogs, French fried potato, deep fried chicken, Japanese takoyaki, sausages, rice cakes, rice, ice cream, Chinese noodle, Japanese noodle, stew, soup, curry, vegetables, fruits, meat, fish, dried foods, cold and hot drinks such as juice, coffee, beer, tea, milk, etc., and edible containers such as cone cups for ice cream. Moreover, the molded articles of the present invention can be used for a variety of products, for example, flowerpots, golf tees, packaging materials, garbage containers, chopsticks, folding fans, etc. Furthermore, the molded articles of this invention can be easily made lighter in weight or thinner. For instance, it is advantageous to have lighter, thinner food containers, since the containers can be stacked in a reduced volume making it possible to transport and store the molded articles with improved efficiency.

In addition, as described above, since the molded articles of this invention are biodegradable, they are easily decomposed by microbes, bacteria, etc., in the soil when buried. Therefore, the problem of environmental disruption associated with disposal of ordinary plastic containers can be eliminated. Although the period required for the degradation differs depending on the materials used, it generally takes about 2 to 10 weeks. The waste molded articles may be disposed of by burying them in the soil, or may be used as feed for animals, depending on the materials used. It is also possible to compost the molded articles as a fertilizer.

For a fuller understanding of the nature and advantages of the invention, reference should be made to the ensuing detailed description taken in conjunction with the accompanying drawings.

BRIEF DESCRIPTION OF THE DRAWINGS

FIG. 6 is a cross-sectional view showing still another example of molds used for the present invention.

FIG. 7 is a cross-sectional view showing still another example of molds used for the present invention.

DETAILED DESCRIPTION OF THE PREFERRED EMBODIMENTS

Devices

Figure 1:
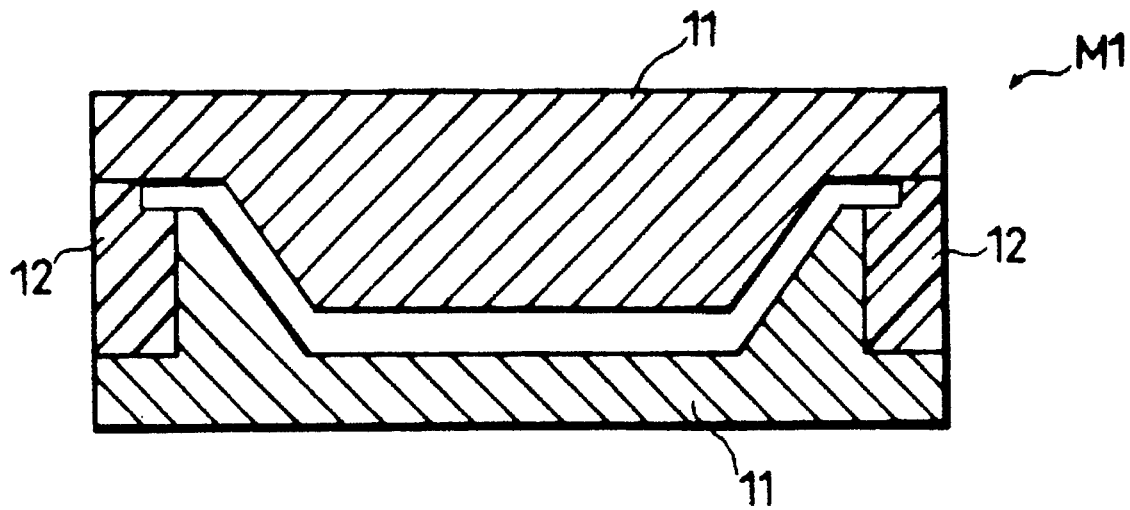
FIG. 1 is a cross-sectional view showing an example of molds used for the present invention.
Figure 2:
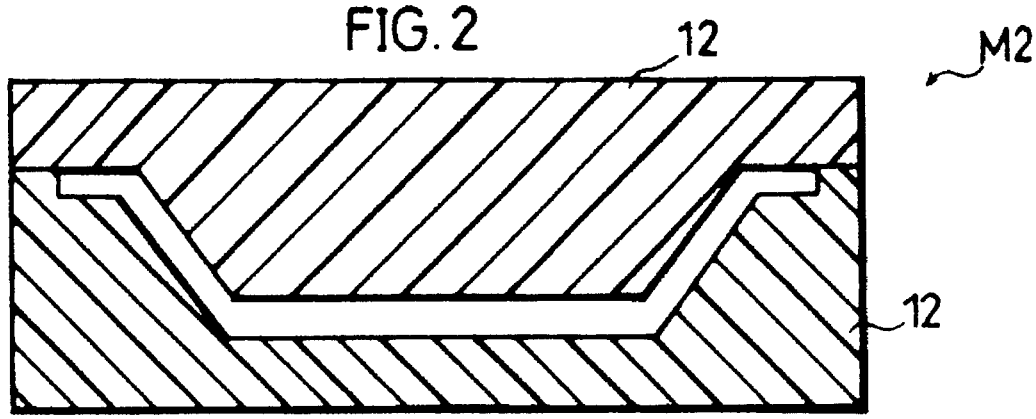
FIG. 2 is a cross-sectional view showing another example of molds used for the present invention.
Figure 3:
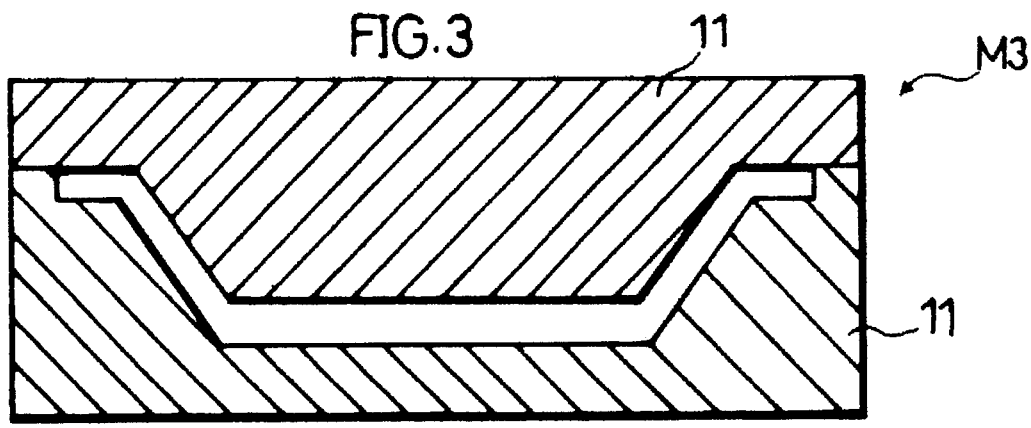
FIG. 3 is a cross-sectional view showing still another example of molds used for the present invention.
Figure 4:
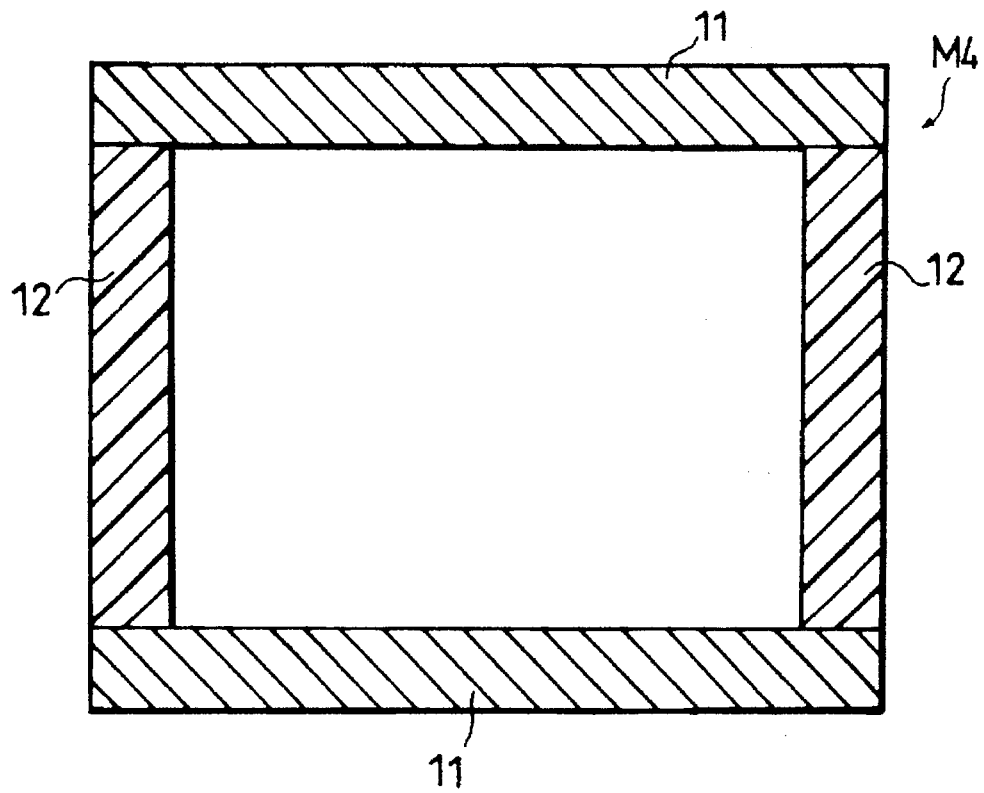
FIG. 4 is a cross-sectional view showing still another example of molds used for the present invention.
Figure 5:
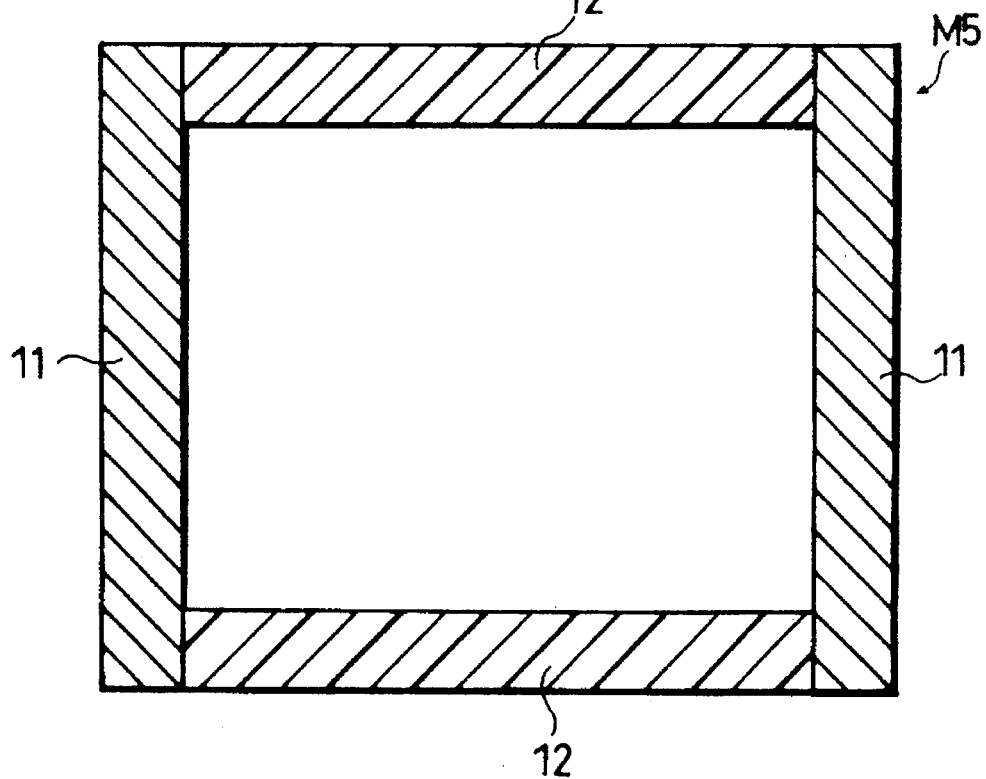
FIG. 5 is a cross-sectional view showing still another example of molds used for the present invention.

First, devices used in some of the examples of the present invention are explained. The following examples use six types of devices: four types of electromagnetic heating devices (A to D), one conventional thermal conductive heating device (E) for comparative purposes and one extruder (F) for preparing a material. The structures of these devices are discussed below.

The electromagnetic heating devices are a high-frequency electroconductive heating device A, a high-frequency dielectric heating device B, a high-frequency dielectric heating device C, and a low-frequency electroconductive heating device D.

The high-frequency electroconductive heating device A includes a power source operated at 60 Hz and 200 V, a power control device, a frequency changer for converting frequencies ranging from several hundred kHz to several MHz, and electrodes.

The high-frequency dielectric heating device B includes a power source operated at 60 Hz and 200 V, a power control device, oscillators of 13.56 MHz, 27.12 MHz and 40.68 MHz, and electrodes.

The high-frequency dielectric heating device C includes a power source operated to 60 Hz and 200 V, a power control device, oscillators of 13.56 MHz, 27.12 MHz, 40.68 MHz and 2450 MHz, and an electromagnetic radiation space.

The low-frequency electroconductive heating device D includes a power source operated at 60 Hz and 200 V, a power control device, and electrodes.

The conventional thermal conductive heating device E includes a power source operated at 60 Hz and 200 V, and a temperature changeable heating plate. The extruder F is a twin screw extruder including a sheet shaping die.

The power sources of the devices A to E are industrial-use power sources with a voltage of 200 V and a frequency of 60 Hz. The power control devices in the devices A to D are devices for regulating outputs at an arbitrary constant output level. The frequency changer in the device A is a device for converting a current with a frequency of 60 Hz into a current with an arbitrary frequency within the range of from several hundred kHz to several MHz and outputting the resultant current. The oscillators in the devices B and C are devices for producing oscillations only at predetermined frequencies. As described above, three types of oscillators of 13.56 MHz, 27.12 MHz and 40.68 MHz were used in the device B, and four types of oscillators of 13.56 MHz, 27.12 MHz, 40.68 MHz and 2450 MHz were used in the device C.

The electrodes in the devices A, B and D are devices for supplying a high-frequency current or a low-frequency current to a material to be molded through a mold.

The electromagnetic radiation space in the device C is a space surrounded by metal plates, in which electromagnetic waves are radiated while reflecting the electromagnetic waves within the space without leakage. When using the device C, the material to be molded is placed into a mold or a supporting member such as a container, made of a material that passes electromagnetic waves, and molding is performed by inserting the mold or the supporting member into the above space and by performing heating.

The temperature changeable heating plate in the device E is a heating plate incorporating a nichrome wire to which a power source is connected. In the device E, different from devices A to D, electric power is applied only to the nichrome wire. This heating plate is used for heating the mold mounted on the heating plate. In addition, the heating plate has a temperature control function.

Molds

It is possible to employ manufacturing methods using a mold or no mold depending on conditions, for example, the material used, the type and quality of target biodegradable molded articles.

In an example of the method for manufacturing biodegradable molded articles using high-frequency electroconductive heating, low-frequency electroconductive heating and a mold, for example, a material is placed into a desired mold, and an electric current is applied to the material through the mold mounted on electrodes.

In an example of the method for manufacturing biodegradable molded articles using high-frequency dielectric heating and a mold, similarly to the method using electroconductive heating, for example, a material is placed in direct contact with a mold mounted on electrodes. In another method, the material is placed into a desired mold, positioned in an electric field (electromagnetic radiation space), and subjected to dielectric heating.

Seven examples of the mold for use in some examples of the present invention are shown in FIGS. 1 to 7. Each of the molds M1 to M7 has either or both a conducting section 11, which permits the flow of a current therein, and an insulating section 12 which prevents the flow of a current therein. A material which is entirely made of aluminum or stainless steel was used as the conducting section 11 in this example. Materials for the conducting section 11 are not particularly limited to those mentioned above, and there is no need to form the entire body of the conducting section 11 by metal if conductive metal which is in contact with the electrodes is exposed on the surface of the material to be molded, i.e., at the contact of the conducting section 11 and the material. The exposed section of the surface may be formed by meshes or lines of metal.

The conducting metal is not limited to the above-mentioned two kinds of metal, and suitable materials, for example, steel or iron may be used. It is also possible to adjust the amount of current flowing through an object to be heated, to prevent materials. The location, spark and a local current at the interface, and to improve mold release characteristics by coating the surface of the conducting metal with ceramics and fluorocarbon resins such as Teflon (polytetrafluoroethylene).

A PEEK (polyether ether ketone), polyimide resin, ceramics, resin-coated wood, etc. were used for the insulating section 12 in this example. However, in electroconductive heating, any materials, for example, resins including synthetic resins such as plastics and natural resins, and leathers, may be used as long as these materials have suitable electrical insulating properties and strength. Whereas, in dielectric heating, any materials may be used as long as they have electrical insulating properties, a small dielectric loss and suitable strength.

Each of the molds M1 to M3 is a mold for molding a tray, and has a width of 150 mm, a length of 250 mm, and a height of 20 mm. Each of the molds M4 to M7 is a mold for molding a cube, and has a width of 100 mm, a length of 100 mm, and a height of 100 mm.

Each of the molds M1 to M7 is provided with a hole or a slit for removing vapor which is generated during the manufacture of molded articles and excess raw materials. The number, size and shape of the hole or slit are freely determined depending on the amount of vapor to be generated during manufacturing, the size and shape of the molded article, and the kind of material to be heated. The molds M1 to M7 may be fixed, if necessary, during the manufacture of molded articles.

These are only some examples of manufacturing biodegradable molded articles using a mold, and the method for manufacturing biodegradable molded articles of the present invention is not limited to methods using a mold. Furthermore, when a mold is used for the manufacture of biodegradable molded articles, the way of using the mold is not limited to those mentioned above.

Preparation of Materials

The following description discusses examples of the method for preparing materials for use in a molding process using electromagnetic heating. Since a wide variety of materials in the form of liquid, slurry, dough or sheet are used for molding, any method suitable for forming the materials may be employed. Namely, the present invention is not restricted to the following preparation methods:

(1) Agitation using a mixer:

A material in the form of a liquid, dough or slurry is prepared by uniformly agitating and mixing biodegradable raw materials with a mixer.

(2) Preparation by electroconductive heating:

A sheet is produced by applying low-frequency electroconductive heating or high-frequency electroconductive heating to the material prepared by the preparation method 1. Then, the processed sheet is cut into a suitable size and used as a material to be molded. The sheet may be divided into pellets and used as a material to be molded.

(3) Preparation by extruder:

Biodegradable raw materials are placed into the extruder in the device F. The resulting sheet is cut into a suitable size and used as a material to be molded.

This is only one example using extrusion, and the present invention is not limited to this example. Namely, it is possible to process the raw materials into the form of pellets or strings as well as sheets.

Some examples of the present invention are presented below. However, the present invention is not limited to these examples. For instance, the kinds of raw materials used and the manufacturing conditions may be varied within the scope of the present invention.

EXAMPLE 1

First, raw materials for biodegradable molded articles will be explained.

In a method for manufacturing biodegradable molded articles according to this example, soybean protein and water are used as raw materials. However, any biodegradable materials which are decomposable by bacteria, microbes, etc. in the soil are usable as raw materials.

Examples of the raw materials are:

(1) proteins including vegetable proteins and animal proteins, such as soybean protein, corn protein, casein, gluten, egg white, milk protein, wheat protein, collagen, microbe protein (single-cell protein), and mixtures thereof;

(2) grain (or grain powder) such as soybean (or soybean powder), corn (or corn powder) and wheat (or flour), materials including proteins, for example, eggs, dairy products, and mixtures thereof;

(3) starches, such as corn starch, potato starch, tapioca starch, rice starch, sweet potato starch and wheat starch, starch derivatives such as α-starches or denatured starches of the above, and mixtures thereof;

(4) residues remaining after taking out essential portions of effective elements in foods and/or food materials, such as vegetables, fruits and grains; and (5) mixtures of (1) to (4).

Some examples of residues are:

(a) squeezed and strained residues resulting from producing, processing or manufacturing foods made from vegetables or fruits such as celery, carrot, tomato, citrus fruits (orange, lemon, grapefruit, etc.), apple, grape, berries, pineapple, sugar cane, and sugar beet, and from producing sugar, and mixtures thereof;

(b) residues, resulting from producing processed foods made from grains, (for example, the residue from TOFU (soybean curd) processing, which is called OKARA in Japan), residues, such as beer yeast, resulting from production of liquors (Japanese sake, distilled spirits and beer, etc.) from grains, and mixtures thereof;

(c) residues resulting from infusing drinks, such as coffee, tea, ptisan, green tea, and oolong tea, for example, ground beans and leaves after infusion, and mixtures thereof;

(d) residues resulting from squeezing oils from soybeans, corn, rapeseeds, sesame seeds, etc., and mixtures thereof;

(e) residues such as wheat bran, rice bran, rice hull, etc. resulting from refining grains, residues such as gluten meal resulting from starch production, and mixtures thereof;

(f) residues such as baking crumbs of cone cups, biscuits, wafers, waffles, etc., resulting from producing confectioneries and breads;

(g) residues noted in (a) to (f) above, to which drying and crushing processes have been applied; and (h) mixtures of the residues recited in (a) to (g) above.

The above-listed materials may be used as a principal material together with the following auxiliary materials:

As a strength adjusting agent for the molded articles, any of the materials recited in (1) to (5) above may be used. Some other examples are:

(6) saccharides, for example, monosaccharides, such as glucose and fructose, disaccharides such as sucrose, maltose and lactose, oligosaccharides, corn syrup, dextrins, isometric saccharides, and mixtures thereof;

(7) sugar alcohols such as sorbitol, mannitol, lactitol, and mixtures thereof;

(8) fats and oils such as vegetable fats and oils, animal fats and oils, processed vegetable and animal fats and oils, and mixtures thereof;

(9) wax such as carnauba wax, candelilla wax, beeswax, paraffin wax, microcrystalline wax, and mixtures thereof;

(10) thickening polysaccharides, including those produced from microbes, for example, xanthan gum and gellan gum, and those produced from plants, for example, guar gum, locust bean gum, pectin gum, arabic gum, karaya, tara gum, carageenan, furcellaran, agar, alginic acid, salts thereof, and mixtures thereof;

(11) salts of compounds, for example, chloride, sulfate, organic oxide, nitride, carbonate, hydroxide, phosphoride of metals such as calcium, sodium, potassium, aluminum, magnesium and iron, and mixtures thereof;

(12) insoluble minerals, such as ground quartz, diatomite, talc and silicone, and mixtures thereof;

(13) vegetable fibers such as cellulose, microcrystalline cellulose, paper, carboxymethylcellulose, methylcellulose and acetylcellulose, their derivatives, and mixtures thereof;

(14) inorganic substances such as glass, metal, carbon and ceramics, fibers thereof, structural materials thereof, and mixtures thereof;

(15) seashells, powdered bones, eggshells, leaves, powdered wood, and mixtures thereof;

(16) non-fiber fillers, such as calcium carbonate, carbon, talc, titanium dioxide, silica gel and aluminum oxide, and mixtures thereof;

(17) fatty acids such as stearic acid, lactic acid and lauric acid, salts such as metal salts thereof, fatty acid derivatives such as amide acid and ether, and mixtures thereof;

(18) glycerin, polyglycerin, propylene glycol, ethylene glycol, esters of fatty acid with glycerin, esters of fatty acid with polyglycerin, esters of fatty acid with propylene glycol, sugar ester, lecithin, esters of fatty acid with sorbitan, polysorbate, or other food additives, and mixtures thereof;

(19) natural resins such as shellac, rosin, sandarac resin, gutta percha and dammar gum, biodegradable resins, such as polyvinyl alcohol and polylactic acid, and mixtures thereof;

(20) acetyl tributyl citrate, zirconium salt solution, ammonium zirconium carbonate alkali solution, and mixtures thereof; and

(21) mixtures of the materials recited in (1) to (20) above.

As for a plasticizer, which is one of the auxiliary materials, any materials recited in (1) to (17) and (19) may be used. It is also possible to use, for example, (22) acetyl tributyl citrate and alcohols such as glycerin, polyglycerin, propylene glycol and ethylene glycol, and mixtures thereof, or (23) a mixture of these plasticizers.

Similarly, some examples of an emulsifying agent are: esters of fatty acid with glycerin, esters of fatty acid with polyglycerin, esters of fatty acid with propylene glycol, sugar esters, esters of fatty acid with sorbitan, lecithin, polysorbate, and mixtures thereof.

As to a stabilizing agent, any material listed in (1) to (3), (6), (7), (10), (13) (excluding paper), (17) above, or (24) a mixture of these stabilizing agents may be used.

A separating agent may be selected from materials listed in (8), (9), (17) above, or (25) mixtures of these separating agents.

An agent for adjusting the texture and homogeneity of the molded articles may be selected from the materials listed (1) to (21) above, or (26) mixtures of these adjusting agents.

Similarly, a water and moisture resistance imparting agent may be selected from the materials listed in (1), (8), (9), (11), (12), (19) above, or (27) mixtures of these water and moisture resistance imparting agents.

A humectant may be selected from the materials listed in (1) to (11), (13), (15) to (18) above, or (28) mixtures of these humectants.

A material handling adjusting agent (slurry adjusting agent) may be selected from any materials that can be used as plasticizers, emulsifying agents, and stabilizing agents, or (29) mixtures thereof.

Some examples of electrical conductivity adjusting agents are: the materials noted in (8) to (11) above; (30) amino acid salts, such as monosodium glutamate, nucleotic acid salts, such as sodium inosinate, conventionally used seasonings, such as vinegar, Japanese sake, Japanese sweet sake (used as seasoning), spices, mustard, Japanese horseradish and Japanese miso, and mixtures thereof; and (31) mixtures of the above electrical conductivity adjusting agents.

The dielectric loss adjusting agents may be selected from the materials listed in (8), (9), (11), (12), (14) and (30) above, (32) zirconinum salt, ammonium zirconium carbonate solution, and (33) mixtures of the above materials.

Some examples of preservatives are (34) sorbic acid and salts thereof (potassium salt, sodium salt, etc.), benzoic acid, salts thereof (potassium salt, sodium salt, etc.), ester compounds of benzoic acid, dehydroacetic acid, salts thereof (potassium salt, sodium salt, etc.), thiabenzazole, OPP (orthophenylphenol), salts thereof (potassium salt, sodium salt, etc.,), diphenyl, and mixtures of the above materials.

Some examples of expanding agents are (35) benzenesulfohydrazine compound, azonitrile compound, nitroso compound, diazoacetamide compound, azocarboxylic acid compound, ammonia system baking powder, sodium bicarbonate, ammonium alum, tartaric hydrogen salt (potassium, etc.,), magnesium carbonate, formulations of the above, and mixtures of the above.

Additionally, it is possible to add seasonings disclosed in (30) and mixtures thereof; (36) inorganic pigment, natural or synthetic dye, coloring agents such as caramel, cacao powder and carbon black, and mixtures thereof; (37) flavors such as natural and synthetic flavors and adjusting agents, and mixtures thereof; and (38) mixtures of the materials listed in (30), (36) and (37) above.

It is also possible to add mixtures of any selected materials from the above-mentioned auxiliary materials.

Next, the following description discusses a method for manufacturing biodegradable molded articles.

In this example, the above-mentioned materials are used as raw materials for biodegradable molded articles, and the biodegradable molded articles are manufactured by the following heating methods which use several types of heating either alone or in combination.

1) A method in which only high-frequency electroconductive heating is used.

2) A method in which only high-frequency dielectric heating is used.

3) A method in which high-frequency dielectric heating is performed after high-frequency electroconductive heating.

4) A method in which high-frequency electroconductive heating is performed after high-frequency dielectric heating.

5) A method in which low-frequency electroconductive heating is used before or after the heating methods 1) to 4).

In order to carry out high-frequency electroconductive heating, low-frequency electroconductive heating and/or high-frequency dielectric heating, in this example, a heating device which includes, for example, an AC power source capable of freely setting a voltage and a pair of electrodes connected thereto and is applicable to the above heating methods is used.

A biodegradable molded article, which has a uniform structure and can be disposed of in a simple manner, was efficiently produced by placing any of the above-mentioned raw materials in the heating device and heating the raw materials by the above-mentioned heating methods 1) to 5).

As described above, in this embodiment, since the heat is generated in the biodegradable material itself by the application of high-frequency electroconductive heating and/or high-frequency dielectric heating to the material, variations in the temperature are unlikely to occur in heating the material. It is therefore possible to uniformly heat the entire material in a shorter period of time with a reduced amount of heat dissipation in the surrounding area (i.e., heat loss) and with improved energy efficiency.

Moreover, high-frequency electroconductive heating and high-frequency dielectric heating can more efficiently and uniformly heat the material when the moisture content of the material is relatively low.

Since biodegradable molded articles having a uniform structure are produced within a short time, the quality and mass-productivity are significantly improved compared to, for example, conventional thermal conductive heating. Furthermore, since a required device is similar in size compared with that required when, for example, performing compression molding, the cost of equipment is reduced. Additionally, since noise and vibration are unlikely to occur, the working environment is not adversely affected.

In addition, by using low-frequency electroconductive heating in combination with high-frequency electroconductive heating and/or high-frequency dielectric heating, it is possible to use both the advantages of high-frequency electroconductive heating and/or high-frequency dielectric heating and low-frequency electroconductive heating for the manufacture of biodegradable molded articles.

Furthermore, in this embodiment, biodegradable molded articles were produced using extrusion together with the heating methods 1) to 5).

When extrusion is adapted, for example, the raw material is first placed into the extruder, and then mixing, kneading, shearing, heating and expanding are performed.

By using extrusion together with high-frequency electroconductive heating and/or high-frequency dielectric heating, quality biodegradable molded articles were mass-produced with further improved energy efficiency in a further reduced time.

The use of and order of high-frequency electroconductive heating, high-frequency dielectric heating, low-frequency electroconductive heating, and extrusion are not limited to those mentioned above. Namely, they are suitably selected and combined depending on the material used and the characteristics of biodegradable molded articles.

EXAMPLE 2

The following description discusses another example of the manufacture of an actual molded article of this invention.

Materials to be molded having the compositions shown in Tables 1 and 2 were prepared by the preparation method 1. The molded articles were produced by heating the materials with each of the heating devices A to C, and the molding times were measured.

More specifically, the mold used was heated to a predetermined temperature in advance, and then electromagnetic heating was performed. Trays having 150 mm in width, 250 mm in length, and 20 mm in thickness were molded using the material having the composition shown in Table 1. The results are shown in Table 3. Similarly, cubes having 100 mm in width, 100 mm in length, and 100 mm in height were molded using the raw material having the composition shown in Table 2. The results are shown in Table 4. The times shown in Tables 3 and 4 indicate the time taken for producing quality molded articles.

For comparison purposes, conventional thermal conductive heating was applied to the mold which was heated to the same temperature in advance by the conventional thermal conductive heating device E. Table 3 shows whether a molded article was formed or not and the quality of the molded article.

TABLE 1

| Ingredients | Composition (weight %) |
| --- | --- |
| flour | 33.3 |
| corn starch | 22.7 |
| sugar (plasticizer) | 3.3 |
| rapeseed oil (separating agent) | 1.7 |
| xanthan gum (stabilizing agent) | 0.3 |
| water | 38.7 |

TABLE 2

| Ingredients | Composition (weight %) |
| --- | --- |
| potato starch | 60 |
| sodium bicarbonate (expanding agent) | 1 |
| sorbitol (plasticizer) | 3 |
| magnesium stearate (separating agent) | 5 |
| water | 31 |

TABLE 3

| Heating method | A | B | C | E |
| --- | --- | --- | --- | --- |
| Mold temp. | | | | |
| 25° C. | 80 sec. | 35 sec. | 35 sec. | not molded |
| 70° C. | 80 sec. | 35 sec. | 35 sec. | not molded |
| 110° C. | 65 sec. | 25 sec. | 25 sec. | not molded |
| 150° C. | 50 sec. | 20 sec. | 20 sec. | defective molding |
| 190° C. | 55 sec. | 20 sec. | 20 sec. | 180 sec. |
| Type of mold | M1 | M1 | M2 | M3 |
| Frequency | 1 MHz | 13.56 MHz | 2450 MHz | — |
| Output | 200 W | 5 kW | 5 kW | — |

TABLE 4

| Heating method | A | B | C | E |
| --- | --- | --- | --- | --- |
| Mold temp. | | | | |
| 25° C. | 100 sec. | 50 sec. | 30 sec. | not molded |
| 70° C. | 100 sec. | 50 sec. | 30 sec. | not molded |
| 110° C. | 85 sec. | 40 sec. | 25 sec. | not molded |
| 150° C. | 77 sec. | 35 sec. | 20 sec. | burned contact surface, unheated inside (180 sec.) |
| 190° C. | 75 sec. | 35 sec. | 20 sec. | burned contact surface, unheated inside (180 sec.) |
| Type of mold | M5 | M5 | M6 | M7 |
| Frequency | 1 MHz | 13.56 MHz | 2450 MHz | — |
| Output | 200 W | 5 kW | 5 kW | — |

The results show that although there are slight differences depending on the temperature of the mold and heating method, the heating methods used in this example are superior to the conventional thermal conductive heating method. Namely, the heating methods of this example enable the manufacture of molded articles at mold temperatures at which molding is infeasible with conventional thermal conductive heating, and achieve a significant reduction in the molding time.

EXAMPLE 3

A material to be molded, in the form of a slurry containing 60 percent by weight of water, was prepared from a raw material having the composition shown in Table 5 by agitating and mixing the raw material according to the preparation method 1.

TABLE 5

| Ingredients | Composition (weight %) |
| --- | --- |
| rice powder | 30 |
| gluten | 5 |
| calcium laurate (separating agent) | 2 |
| powdered silica (strength adjusting agent) | 2 |
| mannitol (plasticizer) | 1 |
| water | 60 |

Molding was performed by setting the heating devices as shown in Table 6 and using such devices, either alone or in combination, so that molded articles had a moisture content of 5 percent by weight. The heating time necessary for fabricating quality molded articles was observed. Tables 7 and 8 show the results. In Table 8, arrows indicate the order of carrying out the heating treatment. For example, "D (12 seconds)→B (13 seconds)" means performing heating for 12 seconds using the heating device D, and then executing heating for 13 seconds using the heating device B.

TABLE 6

| Heating device | A | B | C | D |
| --- | --- | --- | --- | --- |
| Frequency | 800 kHz | 40.68 MHz | 2450 MHz | 60 Hz |
| Output | 500 W | 5 kW | 5 kW | 200 W |
| Mold | M1 | M1 | M2 | M1 |

TABLE 7

| Heating device (heating time) | A (60 sec.) | B (40 sec.) | C (40 sec.) |
|---|---|---|---|
| Total molding time | 60 sec. | 40 sec. | 40 sec. |

*Heating device D was not examined

TABLE 8

| Heating device (heating time) | D (12 sec.) ↓ B (13 sec.) | D (12 sec.) ↓ C (13 sec.) | D (5 sec.) ↓ A (5 sec.) ↓ B (10 sec.) |
|---|---|---|---|
| Total molding time | 25 sec. | 25 sec. | 20 sec. |

As is clear from the results, when a raw material having a high moisture content is used as in this example, the total molding time is reduced by first treating the raw material with low-frequency electroconductive heating using the heating device D. Moreover, it is clear from the results that since the level of output was lowered, the energy efficiency was improved.

EXAMPLE 4

In this example, molded articles were produced by heating raw materials having varying moisture content as shown below in the same manner as in Example 3 by performing low-frequency electroconductive heating and then high-frequency dielectric heating.

More specifically, raw materials having the compositions shown in Table 9 were used, and agitating and mixing were performed by the preparation method 1.

Next, sheets were fabricated by placing the mixed materials on flat electrodes (not shown) according to the preparation method 2. Namely, the mixed materials were heated for 10 seconds by setting the frequency and output of the low-frequency electroconductive heating device D at 60 Hz and 200 W, respectively.

As a result, three kinds of sheets having the moisture contents shown in Table 9 were produced. Namely, compositions a, b, and c in Table 9 indicate that the moisture contents of the sheets are 30 percent, 50 percent, and 70 percent by weight, respectively.

Molded articles similar to those produced by application of low-frequency electroconductive heating were fabricated by performing high-frequency electroconductive heating instead of low-frequency electroconductive heating.

TABLE 9

| | Composition (weight %) | | |
|---|---|---|---|
| Ingredients | a | b | c |
| soybean protein | 55 | 35 | 15 |
| sugar (plasticizer) | 4 | 4 | 4 |
| magnesium chloride (electrical conductivity adjusting agent) | 3 | 3 | 3 |
| stearic acid (separating agent) | 3 | 3 | 3 |
| water | 35 | 55 | 75 |
| Moisture content of sheet (weight %) | 30 | 50 | 70 |

Each of the sheets was cut into a suitable size and used as the material to be molded. Then, thermal molding was performed by setting the heating devices as shown in Table 10 and by applying heating to the materials to be molded using only one of or a plurality of the heating devices.

TABLE 10

| Heating device | A | B |
|---|---|---|
| Frequency | 1 MHz | 27.12 MHz |
| Output | 300 W | 5 kW |
| Mold | M1 | M1 |

The heating time, moisture content after the molding process, and moldability were observed. Tables 11 to 13 show the results. Similar to the above-mentioned example, the arrows in these tables indicate the order of executing the heating treatment. Moreover, in the tables, the double-circle means "excellent", the single-circle means "good", and the triangle means "relatively poor".

TABLE 11

| (Composition c) | | | |
|---|---|---|---|
| Heating device (heating time) | A (30 sec.) | B (30 sec.) | A (15 sec.) ↓ B (15 sec.) |
| Moisture content before molded (wt. %) | | 70 | |
| Moisture content after molded (wt. %) | 35 | 16 | 7 |
| Moldability | △ | ○ | ⊙ |

TABLE 12

| (Composition b) | | | |
|---|---|---|---|
| Heating device (heating time) | A (30 sec.) | B (30 sec.) | A (15 sec.) ↓ B (15 sec.) |
| Moisture content before molded (wt. %) | | 50 | |
| Moisture content after molded (wt. %) | 25 | 10 | 5 |
| Moldability | △ | ○ | ⊙ |

TABLE 13

| (Composition a) | | | |
|---|---|---|---|
| Heating device (heating time) | A (20 sec.) | B (20 sec.) | A (10 sec.) ↓ B (10 sec.) |
| Moisture content before molded (wt. %) | | 30 | |
| Moisture content after molded (wt. %) | 12 | 7 | 10 |
| Moldability | △ | ⊙ | ○ |

As is clear from the results, when the sheet has a high moisture content before molded, it is preferable to carry out both of high-frequency electroconductive heating with the heating device A and high-frequency dielectric heating with the heating device B in order to perform molding in a shorter time. On the other hand, when the sheet has a low moisture content before being molded, molding is performed in a shorter time by performing only high-frequency dielectric heating, for example, with the heating device B.

It is also possible to continuously produce sheets like the preparation method 3 by using conveyor type electrodes instead of the flat electrodes used in this example.

EXAMPLE 5

A material to be molded was produced from a raw material having the composition shown in Table 14 by agitating and mixing the raw material according to the preparation method 1.

TABLE 14

| Ingredients | Composition (weight %) |
| --- | --- |
| potato starch | 50 |
| water | 50 |

Next, the material to be molded was placed into the mold M1, and dielectrically heated for 10 seconds by setting the frequency and output of the high-frequency dielectric heating device B at 27.12 MHz and 5 kW, respectively. Then, electroconductive heating was performed by switching to the low-frequency electroconductive heating device D whose frequency and output were set at 60 Hz and 200 W, respectively, to fabricate a molded article. Variations in the moisture content and strength of the molded article were measured over time. The results are shown as a condition 1 in Table 15. The strength was examined using a rheometer to measure a maximum stress before the molded article ruptured.

In addition, as a comparative test, a molded article was produced by only performing high-frequency dielectric heating for 60 seconds at a frequency of 27.12 MHz and an output of 5 kW. Variations in the moisture content and strength of the molded article were measured over time. The results are shown as a condition 2 in Table 15.

TABLE 15

| | Condition 1 | | Condition 2 | |
| --- | --- | --- | --- | --- |
| Heating time | Moisture content of molded product (wt. %) | Strength (g) | Moisture content of molded product (wt. %) | Strength (g) |
| 10 sec. | 30 | 40 | 30 | 40 |
| 15 sec. | 27 | 42 | 21 | 50 |
| 20 sec. | 25 | 44 | 15 | 100 |
| 25 sec. | 22 | 50 | 10 | 140 |
| 30 sec. | 19 | 65 | 7 | 110 |
| 35 sec. | 16 | 90 | 5 | 90 |
| 40 sec. | 15 | 100 | 3 | 50 |
| 45 sec. | 14 | 110 | 3 | 50 |
| 50 sec. | 12 | 140 | 2 | 30 |
| 55 sec. | 11 | 160 | 2 | 30 |
| 60 sec. | 10 | 140 | 2 | 26 |

The molded article exhibited satisfactory strength when the moisture content of the molded article was in the range of from 5 to 16 percent by weight due to the relationship between the moisture content and strength shown in Table 15. When the moisture content of the molded article was less than 5 percent by weight, the molded article did not have flexibility, and was fragile. On the other hand, when the moisture content of the molded article exceeded 20 percent by weight, the molded article was too soft and could not keep its shape.

As described above, by performing only high-frequency dielectric heating, the molding time is further reduced. On the other hand, the molded article having desired properties was produced by performing low-frequency electroconductive heating after high-frequency dielectric heating while easily controlling the moisture content of the molded article within a wider range.

EXAMPLE 6

A material having the composition shown in Table 16 was placed into the twin screw extruder of the device F and a sheet was prepared according to the preparation method 3. In this case, five kinds of sheets having varying moisture content were produced by adjusting the amount of water to be put into the extruder together with the raw material having the composition shown in FIG. 16 so that the moisture content of the sheets were 60, 40, 20, 10, and 5 percent by weight, respectively.

TABLE 16

| Ingredients | Composition (weight %) |
| --- | --- |
| flour | 90 |
| corn syrup (plasticizer) | 5 |
| calcium carbonate (strength adjusting agent) | 3 |
| paraffin wax (separating agent) | 2 |

The sheets containing varying moisture content were cut into a suitable size to prepare materials to be molded. Then, the materials were molded by performing heating using the heating devices either alone or in combination, which were set as shown in Table 17.

TABLE 17

| Heating device | A | B | D |
| --- | --- | --- | --- |
| Frequency | 500 kHz | 13.56 MHz | 60 Hz |
| Output | 300 W | 5 kW | 300 W |
| Mold | M1 | M1 | M1 |

The heating time, moisture content after the molding process, and moldability were examined. The results are shown in Tables 18 to 22. When the materials before molding had the same moisture content, the same heating time was used for molding, and the moisture content after molding was measured. The molding speed was determined by the amount of reduction in the moisture content.

Tables 18 to 22 shows the results when sheets of the materials containing 60, 40, 20, 10, and 5 percent by weight of moisture, respectively, were used. Similar to the above examples, the arrows in these tables indicate the order of executing the heating treatment. Moreover, the single-circle means "good", the triangle means "relatively poor", and the cross mark means "poor".

TABLE 18

| 1) Moisture content of sheet: 60 weight % | | | | |
| --- | --- | --- | --- | --- |
| Heating device (heating time: seconds) | A (30) | B (30) | A (15) ↓ B (15) | D (15) ↓ B (15) |
| Moisture content after molded (wt. %) | 30 | 10 | 5 | 6 |
| Moldability | Δ | ○ | ○ | ○ |

TABLE 19

| 2) Moisture content of sheet: 40 weight % | | | |
|---|---|---|---|
| Heating device (heating time: seconds) | A (30) | B (30) | A (15) ↓ B (15) |
| Moisture content after molded (wt. %) | 20 | 5 | 3 |
| Moldability | Δ | ◯ | ◯ |

TABLE 20

| 3) Moisture content of sheet: 20 weight % | | | |
|---|---|---|---|
| Heating device (heating time: seconds) | A (20) | B (20) | A (10) ↓ B (10) |
| Moisture content after molded (wt. %) | 15 | 5 | 8 |
| Moldability | Δ | ◯ | ◯ |

TABLE 21

| 4) Moisture content of sheet: 10 weight % | | | | |
|---|---|---|---|---|
| Heating device (heating time: seconds) | A (10) | B (10) | A (5) ↓ B (5) | D (5) ↓ B (5) |
| Moisture content after molded (wt. %) | 9 | 3 | 5 | 8 |
| Moldability | × | ◯ | ◯ | Δ |

TABLE 22

| 5) Moisture content of sheet: 5 weight % | | | |
|---|---|---|---|
| Heating device (heating time: seconds) | A (10) | B (10) | A (5) ↓ B (5) |
| Moisture content after molded (wt. %) | 5 | 3 | 4 |
| Moldability | × | ◯ | ◯ |

As a result of comparing the materials having the same moisture content before molding, the following facts were known. When the material to be molded had a small amount of moisture, i.e., when the moisture content was in the range of from 5 to 20 percent by weight (see Tables 20 to 22) and when the same heating time was used for molding, the application of only high-frequency dielectric heating decreased the moisture content by a larger amount than the application of high-frequency dielectric heating in combination with other type of heating treatment. This shows that when the moisture content of the material before being molded is low, a larger amount of heat is generated and the heating speed is increased by high-frequency dielectric heating rather than low-frequency electroconductive heating and high-frequency electroconductive heating.

On the other hand, when the material to be molded had a large amount of moisture, i.e., when the moisture content is in the range of from 40 to 60 percent by weight (see Tables 18 and 19) and when the same heating time was used for molding, the application of high-frequency dielectric heating in combination with another type of heating treatment decreased the moisture content by a larger amount than the application of only high-frequency dielectric heating. It is thus known that when the moisture content of the material before being molded is high, a larger amount of heat is generated and the heating speed is increased by applying low-frequency electroconductive heating or high-frequency electroconductive heating before high-frequency dielectric heating.

The efficiency of molding can be improved by selecting an optimum heating method depending on the moisture content of a material to be molded.

It is difficult to prepare materials containing not higher than 20 percent by weight of moisture by the preparation method 1. Whereas the preparation method 3 is an effective method for preparing materials having a low moisture content. Moreover, the preparation method 3 is advantageous since it enables continuous production of materials in sheet form.

EXAMPLE 7

Materials to be molded were prepared using raw materials having compositions including whey protein as a principal material as shown in Table 23, according to the preparation method 1. As shown in Table 23, three kinds of molded articles a, b, and c were produced with the use of these materials to be molded. More specifically, tray-like thin molded articles were fabricated by molding these materials using the heating device B employing the high-frequency dielectric heating method (the molded articles a and b) or the heating device E employing the conventional thermal conductive heating method (the molded article c). In this case, the frequency and output of the heating device B were set at 13.56 MHz and 5 kW, respectively.

The moldability, uniformity of structure, flexibility, and molding time ratio were measured. The results are also shown in Table 23. In Table 23, the double-circle means "excellent", the single-circle means "good", the triangle means "relatively poor", and the cross mark means "poor".

TABLE 23

| | Molded articles | | |
|---|---|---|---|
| Ingredients | a | b | c |
| whey protein (weight %) | 50 | 70 | 70 |
| water (weight %) | 50 | 30 | 30 |
| Heating device | B | B | E |
| Mold | M1 | M1 | M3 |
| Moldability | ◯ | ◯ | Δ |
| Uniformity of structure | ◯ | ◎ | × |
| Flexibility | ◯ | ◎ | × |
| Molding time ratio | 2 | 1 | 6 |

As is clear from the results, with the use of high-frequency dielectric heating, when the material to be molded had lower moisture content, the molding time became shorter, and a quality molded article having a uniform structure and improved flexibility was produced.

On the other hand, when conventional thermal conductive heating was applied to a raw material having the same moisture content, it took six times longer than the time required when high-frequency dielectric heating was performed. Moreover, the resulting molded article was fragile and had non-uniform structures between the surface and inside portions thereof.

EXAMPLE 8

Materials to be molded were prepared using two kinds of raw materials having the compositions shown in Table 24 according to the preparation method 1. In this case, the mold M1 was used, and the materials having these compositions were heated with the low-frequency electroconductive heating device D whose frequency and output were set at 60 Hz and 200 W, respectively, and then were heated with the high-frequency dielectric heating device B whose frequency and output were set at 40.68 MHz and 5 kW, respectively.

TABLE 24

| Ingredients | Compositions (weight %) | |
|---|---|---|
| flour | 38 | 29 |
| starch | 9 | 5 |
| sugar | 2 | 15 |
| oil | 0.6 | 0.6 |
| emulsifying agent | 0.1 | 0.1 |
| coloring agent | 0.05 | 0.05 |
| sodium bicarbonate (expanding agent) | 0.15 | 0.15 |
| flavor | 0.05 | 0.05 |
| sodium glutamate (condiment) | 0.05 | 0.05 |
| water | 50 | 50 |

Biodegradable molded articles produced from the raw materials having the above-mentioned compositions using the respective devices had uniform structure, no variations in color, and satisfactory strength. In addition, these molded articles had good taste and texture as edible containers.

EXAMPLE 9

A material to be molded was prepared using a material having the composition shown in Table 25 according to the preparation method 1. In this case, the mold M1 was used, and the material was heated using the high-frequency dielectric heating device B whose frequency and output were set at 27.12 MHz and 7 kW, respectively.

TABLE 25

| Ingredients | Compositions (weight %) |
|---|---|
| potato starch | 50 |
| oil (separating agent) | 2 |
| guar gum (stabilizing agent) | 0.5 |
| water | 47.5 |

A biodegradable molded article produced from the material having the above-mentioned composition using the heating device B had uniform structure, no variations in color, and satisfactory strength.

EXAMPLE 10

Molded articles were manufactured using residues resulting from producing alcoholic drinks such as those shown in Table 26, residues resulting from producing or processing drinks of fruits and vegetables such as those shown in Table 27, residues of bean curd resulting from producing tofu, and residues resulting from producing foods and drinks, for example, tea leaves and ground coffee beans remaining after the infusion of tea or coffee as shown in Table 28.

In the compositions shown in Table 27, egg white was used so as to provide a molded article with a uniform texture. In the compositions of Table 28, titanium dioxide was used as a dielectric loss adjusting agent so as to increase the dielectric loss of the materials to be molded.

The raw materials shown in Table 26 were used as materials to be molded without auxiliary agents. Additionally, materials to be molded were prepared by arranging the materials of Tables 27 and 28 to have the compositions shown in Tables 27 and 28 by the preparation method 1.

TABLE 26

| Ingredients | Compositions (weight %) | | |
|---|---|---|---|
| residues of Japanese sake production | 100 | — | — |
| residues of beer production | — | 100 | — |
| residues of malt from whisky production | — | — | 100 |
| Moldability | ○ | ○ | ○ |

TABLE 27

| Ingredients | Compositions (weight %) | | | | |
|---|---|---|---|---|---|
| residues of squeezed orange | 85 | — | — | — | — |
| residues of squeezed celery | — | 85 | — | — | — |
| residues of squeezed carrot | — | — | 85 | — | — |
| residues of squeezed apple | — | — | — | 85 | — |
| residues of squeezed grape | — | — | — | — | 85 |
| egg white (texture adjusting agent) | 10 | 10 | 10 | 10 | 10 |
| water | 5 | 5 | 5 | 5 | 5 |
| Moldability | ○ | ○ | ○ | ○ | ○ |

TABLE 28

| Ingredients | Compositions (weight %) | | |
|---|---|---|---|
| residues of bean curd | 70 | — | — |
| residues after extracting tea from tea leaves | — | 70 | — |
| residues after extracting coffee from coffee beans | — | — | 70 |
| titanium dioxide (dielectric loss adjusting agent) | 5 | 5 | 5 |
| water | 25 | 25 | 25 |
| Moldability | ○ | ○ | ○ |

Tray-like molded articles were fabricated by dielectrically heating the materials having the above-mentioned compositions through the mold M2 with the high-frequency dielectric heating device C whose frequency and output were set at 2450 MHz and 7 kW, respectively.

The moldability was observed. The results are also shown in Tables 26 to 28. In these tables, the single-circle represents "good".

The biodegradable molded articles produced from any of the raw materials shown in Tables 26 to 28 had satisfactory quality.

EXAMPLE 11

Materials to be molded were prepared using materials having the compositions shown in Table 29 according to the preparation method 1.

Tray-like molded articles containing starch as a principal material were produced by heating the materials to be molded through the mold M1 with the high-frequency electroconductive heating device A whose frequency and output were set at 800 kHz and 200 W, respectively, and then heating with the high-frequency dielectric heating device B whose frequency and output were set at 13.56 MHz and 5 kW, respectively.

The moldability and strength of the molded articles were measured. The results are also shown in Table 29. In Table 29, the single-circle means "good", and the triangle means "relatively poor".

TABLE 29

| Ingredients | Compositions (weight %) | | |
|---|---|---|---|
| flour | 6 | 6 | 6 |
| starch | 40 | 40 | 40 |
| sugar | 2.6 | 2.6 | 2.5 |
| oil | 1 | 1 | 1 |
| emulsifying agent | 0.4 | 0.4 | 0.4 |
| cellulose (strength adjusting agent) | 0 | 5 | 0 |
| paper (strength adjusting agent) | 0 | 0 | 2.5 |
| salt (electrical conductivity adjusting agent) | 0.5 | 0.5 | 0.5 |
| water | 49.5 | 44.5 | 47 |
| Moldability | ○ | ○ | ○ |
| Strength | △ | ○ | ○ |

The results show that adding cellulose or paper as a strength adjusting agent improves the strength of the molded article.

EXAMPLE 12

Materials to be molded were prepared using raw materials having the compositions shown in Table 30 according to the preparation method 1. Tray-like molded articles were fabricated by heating the materials to be molded through the mold M1 with the high-frequency electroconductive heating device A whose frequency and output were set at 1 MHz and 200 W, respectively, and then heating with the high-frequency dielectric heating device B whose frequency and output were set at 27.12 MHz and 7 kW, respectively. In this example, sugar was added as a plasticizer.

The moldability, flexibility and the uniformity of the structure of the molded articles were measured. The results are also shown in Table 30. In Table 30, the double-circle means "excellent", and the single-circle means "good".

TABLE 30

| Ingredients | Compositions (weight %) | |
|---|---|---|
| soybean protein | 60 | 40 |
| sugar (plasticizer) | 0 | 20 |
| water | 40 | 40 |
| Moldability | ○ | ○ |
| Flexibility | ○ | ⊙ |
| Uniformity of structure | ○ | ⊙ |

Both of the biodegradable molded articles produced using the two kinds of raw materials having the above-mentioned compositions had satisfactory quality. The addition of sugar as a plasticizer improved the flexibility and the uniformity of the structure of the molded articles.

For comparison purposes, the same raw materials were heated for the same amount of time by the conventional thermal conductive heating device E. However, the resulting products were too soft and had insufficient strength due to the short heating time.

EXAMPLE 13

Materials to be molded were prepared using raw materials having the compositions shown in Table 31 according to the preparation method 1. Tray-like molded articles were fabricated by heating the materials to be molded through the mold M1 with the low-frequency electroconductive heating device D whose frequency and output were set at 60 Hz and 200 W, respectively, and then heating with the high-frequency dielectric heating device B whose frequency and output were set at 13.56 MHz and 5 kW, respectively.

The moldability and strength of the molded articles were measured. The results are also shown in Table 31. In Table 31, the double-circle means "excellent", and the single-circle means "good".

TABLE 31

| Ingredients | Compositions (weight %) | | |
|---|---|---|---|
| Potato starch | 60 | 60 | 60 |
| Sodium bicarbonate (expanding agent) | 0.3 | 0.3 | 0.3 |
| Sorbitol (plasticizer) | 3 | 1 | 7 |
| Magnesium stearate (plasticizer) | 5 | 7 | 1 |
| Sodium sulfate (electrical conductivity adjusting agent) | 0.5 | 0.5 | 0.5 |
| Water | 31.2 | 31.2 | 31.2 |
| Moldability | ⊙ | ○ | ○ |
| Strength | *1 | *2 | *3 |

*1: flexible and strong
*2: hard and fragile
*3: soft and deformative

As clearly shown in Table 31, by adding 3 percent by weight of sorbitol and 5 percent by weight of magnesium stearate as plasticizers, strong and flexible biodegradable molded articles having excellent moldability can be manufactured.

EXAMPLE 14

Three kinds of materials to be molded were prepared using raw materials having the compositions shown in Table 32 in which wheat gluten was used as a principal material, esters of fatty acid with polyglycerin was used as a material handling adjusting agent, and sodium polyphosphate was used as an electrical conductivity adjusting agent, according to the preparation method 1. Tray-like molded articles were fabricated by heating the material to be molded through the mold M1 with the high-frequency electroconductive heating device A whose frequency and output were set at 1 MHz and 200 W, respectively, and then heating with the high-frequency dielectric heating device B whose frequency and output were set at 13.56 MHz and 5 kW, respectively.

The moldability and mixability of the molded articles were measured. The results are also shown in Table 32. In Table 32, the double-circle indicates "excellent", the single-circle indicates "good", and the triangle indicates "relatively poor".

TABLE 32

| Ingredients | Compositions (weight %) | | |
|---|---|---|---|
| wheat gluten | 65 | 64 | 64 |
| esters of fatty acid with polyglycerin (material handling adjusting agent) | 35 | 35 | 0 |
| sodium polyphosphate (electrical conductivity adjusting agent) | 0 | 1 | 1 |
| water | 0 | 0 | 35 |
| Moldability | △ | ⊙ | ○ |
| Mixability | ⊙ | ⊙ | △ |

As is clearly shown in Table 32, by adding the material handling adjusting agent, smooth materials having desirable properties in their mixability were obtained, and biodegradable molded articles having uniform structure were produced. The results also proved that the addition of the electrical conductivity adjusting agent improved the moldability.

EXAMPLE 15

Three kinds of materials to be molded were prepared using raw materials including dried egg white as a principal material and adding cellulose as a strength adjusting agent and sodium sulfate as an electrical conductivity adjusting agent as shown in Table 33 according to the preparation method 1. Tray-like molded articles were molded by heating the materials to be molded with the low-frequency electroconductive heating device D whose frequency and output were set at 60 Hz and 200 W, respectively, and then heating with the high-frequency dielectric heating device B whose frequency and output were set at 40.68 MHz and 3 kW, respectively.

The molding time ratio and the strength of the molded articles were measured. The results are also shown in Table 33. In Table 33, the double-circle indicates "excellent", and the triangle indicates "relatively poor".

TABLE 33

| Ingredients | Compositions (weight %) | | |
|---|---|---|---|
| dried egg white | 35 | 35 | 35 |
| cellulose (strength adjusting agent) | 0 | 30 | 30 |
| sodium sulfate (electrical conductivity adjusting agent) | 0 | 1 | 2 |
| water | 65 | 34 | 33 |
| Molding time ratio | 4 | 2 | 1 |
| Strength | △ | ◎ | ◎ |

Biodegradable molded articles having good quality were produced from any of the three kinds of raw materials having the above-mentioned compositions. The results also proved that the molding time can be shortened by increasing the electrical conductivity with the addition of the electrical conductivity adjusting agent.

Moreover, the biodegradable molded articles produced by adding cellulose as a strength adjusting agent had excellent strength.

EXAMPLE 16

In this example, the effects of the electrical conductivity adjusting agent and dielectric loss adjusting agent on the heating methods were observed.

Three kinds of materials to be molded a, b and c having the compositions shown in Table 34 were prepared by the preparation method 1. The frequency and output of the high-frequency electroconductive heating device A were set at 1 MHz and 300 W, respectively. The frequency and output of the high-frequency dielectric heating device B were set at 13.56 MHz and 5 kW, respectively. The frequency and output of the high-frequency dielectric heating device C were set at 2450 MHz and 5 kW, respectively.

TABLE 34

| Ingredients | Compositions (weight %) | | |
|---|---|---|---|
| No. | a | b | c |
| collagen | 49.9 | 35 | 50 |
| sugar (plasticizer) | 3 | 3 | 3 |
| talc (strength adjusting agent) | 4 | 4 | 4 |
| magnesium stearate (separating agent) | 3 | 3 | 3 |
| salt (electrical conductivity adjusting agent) | 0.1 | 0 | 0 |
| titanium dioxide (dielectric loss adjusting agent) | 0 | 15 | 0 |
| water | 40 | 40 | 40 |

As shown in Table 35, molded articles were fabricated using the materials having the compositions a to c shown in Table 34 in combination with the heating devices. The molding time taken for the completion of the fabrication of molded articles and the moldability thereof were observed. The results are also shown in Table 35. In Table 35, the single-circle represents "good".

TABLE 35

| Composition No. | a | b | c | a | b | c | a | b | c |
|---|---|---|---|---|---|---|---|---|---|
| First heating device | A | | | A | | | B | | |
| Mold | M1 | | | M1 | | | M1 | | |
| Final heating device | B | | | C | | | C | | |
| Mold | M1 | | | M2 | | | M2 | | |
| Molding time (second) | 20 | 30 | 45 | 25 | 24 | 45 | 40 | 16 | 50 |
| Moldability | ○ | ○ | ○ | ○ | ○ | ○ | ○ | ○ | ○ |

As is clear from the results, quality biodegradable molded articles were manufactured using any of the three kinds of the raw materials having the above-mentioned compositions. It is also known that the molding time of high-frequency electroconductive heating (A) was shortened and the molding time of high-frequency dielectric heating (B) were slightly reduced by adding salt as an electrical conductivity adjusting agent.

On the other hand, when titanium dioxide as a dielectric loss adjusting agent was added, the molding time with the high-frequency electroconductive heating A was not much reduced, but the molding time of high-frequency dielectric heating (B) and the molding time of high-frequency dielectric heating (C) were shortened.

EXAMPLE 17

Eight kinds of materials to be molded were prepared by using corn starch and waxy corn starch as a principal material and adding titanium dioxide as a dielectric loss adjusting agent and sodium bicarbonate as an expanding agent as shown in Table 36 according to the preparation method 1. Molded articles in the shape of a cube were produced by heating the materials to be molded through the mold M6 with the high-frequency dielectric heating device C whose frequency and output were set at 2450 MHz and 7 kW, respectively. The molded articles were 100 mm in length, 100 mm in width, and 100 mm in height.

The moldability, molding time ratio, and molding weight ratio of the molded articles were measured. The results are also shown in Table 36. In Table 36, the single-circle represents "good".

TABLE 36

| Ingredients | Compositions (weight %) | | | | | | | |
|---|---|---|---|---|---|---|---|---|
| corn starch | 70 | 70 | 70 | 70 | 0 | 0 | 0 | 0 |
| waxy corn starch | 0 | 0 | 0 | 0 | 70 | 70 | 70 | 70 |
| titanium dioxide (dielectric loss adjusting agent) | 0 | 5 | 0 | 5 | 0 | 5 | 0 | 5 |
| sodium bicarbonate (expanding agent) | 0 | 0 | 0.5 | 0.5 | 0 | 0 | 0.5 | 0.5 |
| water | 30 | 25 | 29.5 | 24.5 | 30 | 25 | 29.5 | 24.5 |
| Moldability | ○ | ○ | ○ | ○ | ○ | ○ | ○ | ○ |
| Molding time ratio | 5 | 3 | 4 | 2 | 3 | 1.5 | 2 | 1 |
| Molding weight ratio | 2 | 2 | 1.5 | 1.5 | 1.7 | 1.7 | 1 | 1 |

Quality biodegradable molded articles were manufactured using any of eight kinds of the raw materials having the above-mentioned compositions.

It is possible to determine the air content (expansion coefficient) in the molded articles from the molding weight ratio of Table 36. It is also known that the expansion coefficient varies depending on the principal material (starch in this example) and that, even when the same principal material is used, the expansion coefficient of the molded articles is increased by adding an expanding agent. It is thus found that molded articles with a high expansion coefficient (foaming degree) are obtained by using a principal material having a high expansion force or adding an expanding agent to the raw material composition.

In addition, it is known from the molding time ratio shown in Table 36 that, when performing high-frequency dielectric heating, the molding time is shortened by increasing the dielectric loss of the materials to be molded with a dielectric loss adjusting agent.

It is found that, even if a dielectric loss adjusting agent is not added, the molding time is reduced by using materials having a high expansion coefficient. Although the manufactured molded articles have the same size, they have varied expansion coefficients due to the differences in composition thereof. Therefore, the ratio of the amount of material put into the mold is equal to the molding weight ratio. Namely, when the expansion coefficient is large (i.e., when the molding weight ratio is small), a reduced amount of material is used, thereby shortening the molding time.

The weight, cushioning, heat insulating property, and strength of the molded articles can be suitably adjusted by controlling the expansion coefficient. This is particularly effective when producing cushioning materials for use as packaging materials.

EXAMPLE 18

Figure 8:
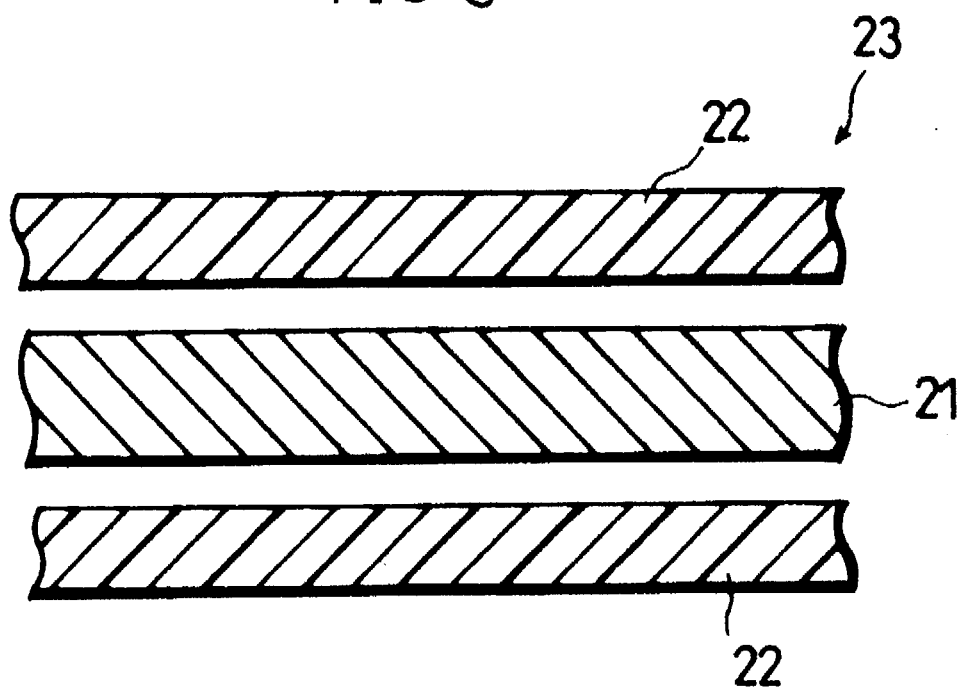
FIG. 8 is a cross-sectional view of a material before molding, prepared by placing a soybean protein sheet on each side of a material to be molded according to a method for manufacturing biodegradable molded articles of the present invention.

In this example, a sheet of material 21 shown in FIG. 8 was prepared from sweet potato starch as a principal material by adding sorbitol as a plasticizer as shown in Table 37 according to the preparation method 3.

TABLE 37

| Ingredients | Composition (weight %) |
|---|---|
| sweet potato starch | 65 |
| sorbitol (plasticizer) | 5 |
| water | 30 |

A material 23 to be molded was prepared by placing the sheet of material 21 and soybean protein sheets 22 having water and moisture resistant properties one upon another in the order shown in FIG. 8, i.e., placing the soybean protein sheets 22 on each surface of the sheet of material 21, and by cutting them into a suitable size.

Figure 9:
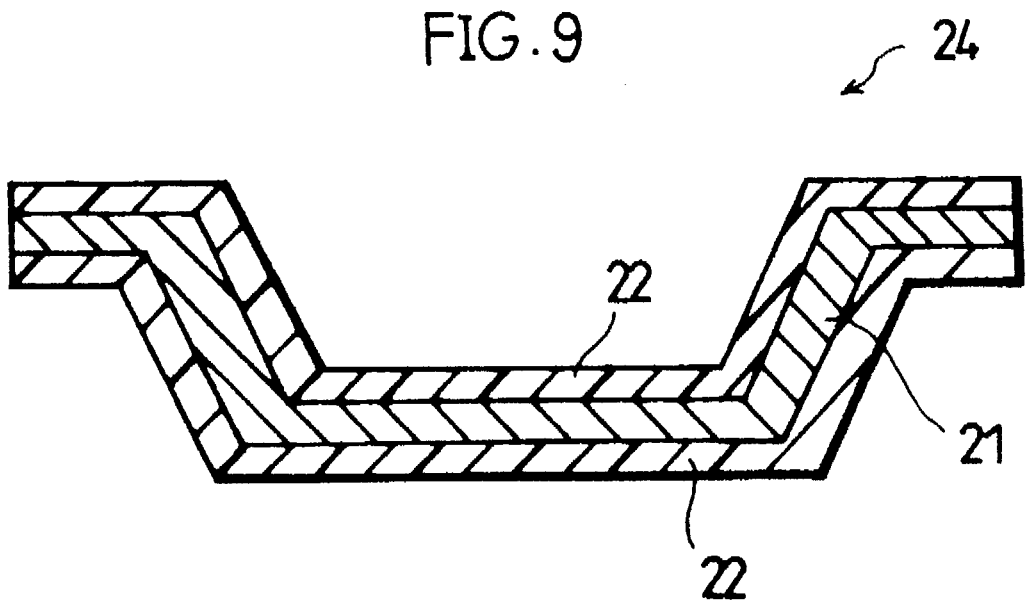
FIG. 9 is a cross-sectional view showing the structure of a molded article produced from the material to be molded shown in FIG. 8.

The material 23 was placed in the mold M1, and dielectrically heated by setting the frequency and output of the high-frequency dielectric heating device B at 13.56 MHz and 5 kW, respectively. As a result, a tray-like molded article 24 which was coated by laminating a surface thereof with soybean protein was fabricated as shown in FIG. 9.

Similar molded articles were produced using dammar resin sheets and carnauba wax sheets in place of the soybean protein sheets.

The water resistance of the tray-like molded articles laminated with sheets of soybean protein, dammar resin, and carnauba wax by the above-mentioned method, and of a non-laminated tray-like molded article were examined. The results are shown in Table 38. 100 ml of water with a temperature of 20° C. was poured into the tray-like molded articles and the time for water to leak from the bottom thereof was observed to determine water resistant properties.

TABLE 38

| Type of water and moisture resistant sheet | Soybean protein | Dammar resin | Carnauba wax | Without sheet |
|---|---|---|---|---|
| Water-resistance properties | 3 hr. | at least 24 hr. | at least 24 hr. | 10 min. |

It is clear from Table 38 that molded articles having water and moisture resistant properties were produced by placing water and moisture resistant sheets over an extruded sheet of material and forming the sheets by electromagnetic radiation heating.

Tray-like molded articles were fabricated by agitating and mixing a raw material having the composition shown in Table 37 according to preparation method 1, placing the resulting material as a material to be molded in the mold M1, and dielectrically heating the material with the high-frequency dielectric heating device B whose frequency and output were set at 13.56 MHz and 5 kW, respectively. Then, the molded articles were laminated with soybean protein sheets, dammar resin sheets, and carnauba wax sheets, respectively, by a pressure-laminating method. As a result, molded articles similar to those shown in FIG. 9 were produced. The molded articles exhibited water resistant properties similar to those shown in Table 38.

In this example, the compression laminating method was used as a method for laminating a tray-like molded article with sheets having water and moisture resistant properties. However, the present invention is not limited to this method, and any methods may be employed as long as they allow laminating a tray surface with sheets having water and moisture resistant properties.

Although the thickness of a laminated section having water and moisture resistant properties is not particularly limited, a thickness not larger than 1 mm is preferable considering the usage, handling and maintenance.

The sheets having water and moisture resistant properties employed in this example may be formed into films. Such sheets and films are generally produced by casting, compression press and extrusion molding methods. However, the formation of such sheets and films is not particularly limited to these methods and sheets and films may be formed by any methods.

Moreover, a plasticizer, an emulsifying agent, a stabilizer, a texture and homogeneity adjusting agent, a preservative, a coloring agent, etc. may be added, if necessary, in forming sheets or films having water and moisture resistant properties.

As for raw materials for sheets and films having water and moisture resistant properties other than those mentioned in this example, the following materials may be used: casein and salts thereof, egg white, gluten, zein, milk protein, gelatin, high protein materials such as yeast extract, grains such as soybeans, gutta percha, sandarac resin, shellac, jelutong, sorva, chicle, myrrh, peru balsam, rosins such as gum rosin, wood rosin and tall oil rosin, gilsonite, rubber, candelilla wax, beeswax, paraffin wax, microcrystalline wax, and mixtures thereof. However, suitable materials for such sheets and films are not limited to those mentioned above, and any materials may be used as long as they have water and moisture resistance and are processable into sheet or film form.

Although both of the front and back surfaces of the trays were laminated in this example, it is also possible to laminate only the front surface thereof depending on the usage.

EXAMPLE 19

In this example, a material to be molded was prepared using a raw material shown in Table 39 according to preparation method 1. A tray-like molded article having 150 mm in width, 250 mm in length, and 20 mm in height was produced by placing the material to be molded in the mold M1, and heating the material with the high-frequency dielectric heating device B whose frequency and output were set at 13.56 MHz and 5 kW, respectively.

TABLE 39

| Ingredients | Composition (weight %) |
| --- | --- |
| potato starch | 45 |
| microcrystalline cellulose | 3 |
| talc | 2 |
| sorbitol | 2 |
| guar gum | 0.3 |
| water | 47.7 |

Next, coating agents were produced by preparing water and moisture resistance imparting agents formed by biodegradable resins, fats, wax, etc. at the compounding ratio shown in Table 40. The coating agents as water and moisture resistance imparting agents were applied to the front and back surfaces of the molded articles. Then, 100 ml of water with a temperature of 20° C. was poured into the coated trays, and the time for water to leak from the bottom thereof was observed to determine water resistant properties.

TABLE 40

| Materials of coating agent | Compositions (weight %) | | | | | |
| --- | --- | --- | --- | --- | --- | --- |
| dammar resin | 30 | 75 | 15 | 12 | 0 | 0 |
| shellac | 0 | 0 | 5 | 5 | 0 | 0 |
| rosin | 0 | 0 | 5 | 5 | 10 | 0 |
| carnauba wax | 0 | 0 | 0 | 0 | 90 | 0 |
| ethanol | 70 | 0 | 50 | 50 | 0 | 0 |
| acetone | 0 | 0 | 25 | 25 | 0 | 0 |
| propylene glycol | 0 | 25 | 0 | 0 | 0 | 0 |
| glycerin | 0 | 0 | 0 | 3 | 0 | 0 |

TABLE 40-continued

| Materials of coating agent | Compositions (weight %) | |
| --- | --- | --- |
| Water-resistance properties | at least 24 hours | 10 min. |

As is clear from Table 40, molded articles having water and moisture resistant properties were produced by spreading and coating the molded articles fabricated by electromagnetic heating with materials having water and moisture resistant properties.

This is an example of forming a water and moisture resistant layer on the surfaces of a molded article fabricated by electromagnetic heating by coating the molded article with a biodegradable water and moisture resistance imparting agent.

The water and moisture resistant layer formed on the front surface of the molded article protects the molded article from moisture. Therefore, even if such a molded article is used as a container for food containing a large amount of moisture, leakage of water hardly occurs. Consequently, the water-resistant, moisture-resistant, and water-proof properties are improved.

Some other examples of water and moisture resistance imparting agents for preparing the coating agent are casein and salts thereof, collagen, egg white, gluten, zein, milk protein, gelatin, high-protein materials such as yeast extract, grains such as soybeans, gutta percha, jelutong, sorva, chicle, myrrh, peru balsam, rosins such as gum rosin, wood rosin and tall oil rosin, gilsonite, rubber, candelilla wax, beeswax, paraffin wax, microcrystalline wax, and mixtures thereof. However, suitable materials for such a coating layer is not limited to those mentioned above.

Solvents, for example, water, alcohol, ether, carbon tetrachloride, acetone, benzene, ethyl acetate, toluene and hexane, may be used for the preparation of solutions (coating agents) having water and moisture resistant properties. However, the solvents are not particularly limited to those materials.

In other examples of the method for coating the surface of the molded article with a solution having water and moisture resistant properties, a water and moisture resistant layer is formed on the surface of the molded article by, for example, spraying a water and moisture resistant solution, or dipping the molded article in the water and moisture resistant solution.

Although the thickness of the water and moisture resistant layer is not particularly limited, a thickness not larger than 1 mm is preferable considering the usage, handling and maintenance. Additionally, although both of the front and back surfaces of the trays were coated in this example, it is also possible to coat only the front surface or back surface thereof depending on the usage.

EXAMPLE 20

In this example, materials to be molded were prepared by adding additives such as biodegradable resins, fats and wax as water and moisture resistance imparting agents to the raw material shown in Table 39 of Example 19 at the ratio shown in Table 41, mixing and agitating the mixture.

Example 20 was carried out in the same manner as in Example 19 except those mentioned above. More specifically, tray-like molded articles having 150 mm in width, 250 mm in length, and 20 mm in height were produced by placing the materials to be molded in the mold M1, and heating the materials with the high-frequency dielectric heating device B whose frequency and output were set at 13.56 MHz and 5 kW, respectively.

100 ml of water with a temperature of 20° C. was poured into the resulting molded articles, and the time r for the water to leak from the bottom thereof was observed to determine water resistant properties. The results are also shown in Table 41.

TABLE 41

| Additives | Amount added (weight %) | | | |
|---|---|---|---|---|
| dammer resin | 4 | 0.5 | 2 | 0 |
| silicon | 0 | 1 | 0 | 0 |
| carnauba wax | 0 | 0.5 | 0 | 0 |
| shellac | 0 | 0 | 1 | 0 |
| rosin | 0 | 0 | 1 | 0 |
| Water-resistance properties | at least 24 hours | at least 24 hours | at least 24 hours | 10 minutes |

As is clear from Table 41, the molded articles produced by adding the above-mentioned additives exhibited water resistant properties for 24 hours or more. Whereas the molded article produced without adding those additives showed water resistant properties only for 10 minutes. This proves that when a molded article is produced by adding a raw material having water and moisture resistant properties to a material to be molded, the molded article has water resistant properties.

EXAMPLE 21

In this example, the moisture content of the molded articles was varied by the following three methods W1, W2 and W3.

In method W1, a material to be molded was prepared using the raw material shown in Table 39 of Example 19 according to preparation method 1. Molded articles having a uniform moisture content (1 percent by weight) were fabricated by placing the material to be molded in the mold M1, and heating the material with the high-frequency dielectric heating device B whose frequency and output were set at 13.56 MHz and 5 kW, respectively.

Then, molded articles having varying moisture contents as shown in Table 42 were produced by subjecting the molded articles to a temperature of 35° C. and a relative humidity of 65 percent and varying the time. The strength of each of the molded articles having varying moisture contents was measured in the same manner as in Example 5. The results are also shown in Table 42.

TABLE 42

| Moisture content (weight %) | Strength (g) |
|---|---|
| 1 | 20 |
| 2 | 30 |
| 3 | 40 |
| 5 | 100 |
| 7 | 120 |
| 9 | 140 |
| 11 | 160 |
| 13 | 140 |
| 15 | 100 |
| 20 | 60 |
| 30 | 40 |
| 40 | 10 |

In method W2, a material to be molded was prepared using the raw material shown in Example 19 according to the preparation method 1. Molded articles were fabricated by placing the material to be molded in the mold M1, and heating the material for 10 seconds with the high-frequency dielectric heating device B whose frequency and output were set at 13.56 MHz and 5 kW, respectively, and then heating with the low-frequency electroconductive heating device D whose frequency and output were set at 60 Hz and 200 W, respectively. In this case, molded articles having varying moisture contents were produced by adjusting the low-frequency electroconductive heating time within a range between zero and 50 seconds as shown in Table 43. The strength of each of the molded articles having varying moisture contents was measured in the same manner as in Example 5. The results are also shown in Table 43.

TABLE 43

| Total molding time (second) | Moisture content (weight %) | Strength (g) |
|---|---|---|
| 10 | 35 | 35 |
| 15 | 30 | 40 |
| 20 | 25 | 50 |
| 25 | 22 | 70 |
| 30 | 18 | 90 |
| 35 | 14 | 130 |
| 40 | 13 | 140 |
| 45 | 12 | 150 |
| 50 | 11 | 160 |
| 55 | 10 | 140 |
| 60 | 9 | 130 |

In method W3, tray-like molded articles having a moisture content of 1 percent by weight as in method W1, were fabricated using the raw material shown in Example 19. Then, molded articles having varying moisture contents were produced by spreading thereon water-containing coating agents (water and moisture resistance imparting agents) shown in Table 44. The strength of each of the molded articles having varying moisture contents was measured in the same manner as in Example 5. The results are also shown in Table 44.

TABLE 44

| Materials of coating agent | Compositions (weight %) | | | | | | |
|---|---|---|---|---|---|---|---|
| dammar resin | 30 | 30 | 30 | 30 | 30 | 30 | not applied |
| ethanol | 70 | 65 | 60 | 55 | 50 | 45 | |
| water | 0 | 5 | 10 | 15 | 20 | 25 | |
| Moisture content in molded product (wt. %) | 1 | 4 | 8 | 12 | 17 | 23 | 1 |
| Strength (g) | 30 | 100 | 150 | 190 | 120 | 75 | 20 |
| Water-resistance properties | at least 24 hours | | | | | | 10 minutes |

It was possible to vary the moisture content of the molded articles by any of the three methods W1 to W3.

It is known from Table 42 that the strength of the molded article depends largely on the moisture content, and that a desirable molded article with improved strength can be produced by adjusting the moisture content in the range of from 3 to 30 percent by weight, more preferably, in the range of 5 to 20 percent by weight. It is thus possible to suitably prevent deformation and cracking of the molded article. Consequently, molded articles are more suitably used in their applications. When the moisture content is less than 3 percent by weight, the resulting molded article becomes fragile. On the other hand, when the moisture content exceeds 30 percent by weight, the resulting molded article becomes too soft and cannot maintain its shape.

In method W3, as shown in Table 44, the strength of each of the molded articles coated with the coating agent was superior to the strength of the molded article which was not coated with the coating agent irrespectively of the moisture content thereof. Particularly, the molded article which was coated with a water-containing coating agent so that the molded article had a moisture content between 4 and 23 percent by weight was strengthened an amount similar to or better than those obtained by the method W1 and W2. Therefore, by adjusting the moisture content of the coating agent to be applied to the molded article, it is possible to simultaneously adjust the moisture content of the molded article and gain desired strength as well as to impart water and moisture resistant properties to the molded article.

EXAMPLE 22

Materials a and b to be molded, having the compositions shown in Table 45, were prepared using raw materials including calcium chloride as a humectant according to the preparation method 1.

TABLE 45

|  | Compositions (weight %) | |
| --- | --- | --- |
| Ingredients | a | b |
| potato starch | 45 | 40 |
| microcrystalline cellulose | 3 | 3 |
| talc | 2 | 2 |
| sorbitol | 2 | 2 |
| guar gum | 0.3 | 0.3 |
| calcium chloride | 0 | 5 |
| water | 47.7 | 47.7 |

Tray-like molded articles were produced by placing the materials to be molded in the mold M1 and heating the materials with the high-frequency dielectric heating device B whose frequency and output were set at 13.56 MHz and 7 kW, respectively.

Then, by subjecting the molded articles to a temperature of 25° C. and a relative humidity of percent, variations of the moisture content of the molded articles were observed over the course of time. The results are also shown in Table 46.

TABLE 46

| Standing time | Moisture content (weight %) | |
| --- | --- | --- |
| (hour) | composition a | composition b |
| 0 | 3 | 3 |
| 1 | 4 | 6 |
| 2 | 5 | 9 |
| 3 | 6 | 11 |
| 4 | 7 | 12 |
| 5 | 8 | 13 |
| 6 | 9 | 14 |
| 7 | 10 | 15 |
| 8 | 11 | 16 |
| 9 | 11 | 16 |
| 10 | 12 | 16 |

It is known from Table 46 that the moisture content of the molded article produced by adding calcium chloride as a humectant to the material to be molded was increased within a shorter time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing biodegradable molded articles, comprising the steps of:
    molding at least one biodegradable material; and heating the biodegradable material by applying high-frequency electroconductive heating to the biodegradable material for an amount of time effective to foam and expand the biodegradable material.

2. The method for manufacturing biodegradable molded articles as set forth in claim 1, further comprising applying low-frequency electroconductive heating to the biodegradable material.

3. The method for manufacturing biodegradable molded articles as set forth in claim 1, further comprising extruding the biodegradable material.

4. The method for manufacturing biodegradable molded articles as set forth in claim 1, wherein the biodegradable material comprises at least one material selected from the group consisting of protein, grain starch, starch derivatives, residues remaining after taking out essential portions of effective elements from foods and drinks and/or raw materials of foods and drinks, foods and drinks, and raw materials of foods and drinks.

5. The method for manufacturing biodegradable molded articles as set forth in claim 1, wherein the biodegradable material includes a strength adjusting agent.

6. The method for manufacturing biodegradable molded articles as set forth in claim 1, wherein the biodegradable material includes a plasticizer.

7. The method for manufacturing biodegradable molded articles as set forth in claim 1, wherein the biodegradable material includes an emulsifying agent.

8. The method for manufacturing biodegradable molded articles as set forth in claim 1, wherein the biodegradable material includes a stabilizer.

9. The method for manufacturing biodegradable molded articles as set forth in claim 1, wherein the biodegradable material includes a separating agent.

10. The method for manufacturing biodegradable molded articles as set forth in claim 1, wherein the biodegradable material includes an agent for adjusting texture and homogeneity of the molded articles.

11. The method for manufacturing biodegradable molded articles as set forth in claim 1, wherein the biodegradable material includes a humectant.

12. The method for manufacturing biodegradable molded articles as set forth in claim 1, wherein the biodegradable material includes a material handling adjusting agent.

13. The method for manufacturing biodegradable molded articles as set forth in claim 1, wherein the biodegradable material includes an electrical conductivity adjusting agent.

14. The method for manufacturing biodegradable molded articles as set forth in claim 1, wherein the biodegradable material includes a dielectric loss adjusting agent.

15. The method for manufacturing biodegradable molded articles as set forth in claim i, wherein the biodegradable material includes a preservative.

16. The method for manufacturing biodegradable molded articles as set forth in claim 1, wherein the biodegradable material includes an expanding agent.

17. The method for manufacturing biodegradable molded articles as set forth in claim 1, wherein the biodegradable material includes a coloring agent.

18. The method for manufacturing biodegradable molded articles as set forth in claim 1, wherein the biodegradable material includes a seasoning.

19. The method for manufacturing biodegradable molded articles as set forth in claim 1, wherein the biodegradable material includes flavoring.

20. The method for manufacturing biodegradable molded articles as set forth in claim 1, wherein the biodegradable material includes a water and moisture resistance imparting agent.

21. The method for manufacturing biodegradable molded articles as set forth in claim 1, further comprising the step of coating a water and moisture resistance imparting agent on the biodegradable material prior to heating the biodegradable material.

22. The method for manufacturing biodegradable molded articles as set forth in claim 1, further comprising the step of adjusting a moisture content of the molded articles within a range of from 3 to 30 percent by weight subsequent to heating the biodegradable material.

23. The method for manufacturing biodegradable molded articles as set forth in claim 1, wherein high-frequency electroconductive heating is applied by placing the biodegradable material between a pair of electrodes and applying a high-frequency voltage between the electrodes.

24. The method for manufacturing biodegradable molded articles as set forth in claim 1, wherein high-frequency electroconductive heating is applied to the biodegradable material for an amount of time effective to yield a biodegradable molded article having a moisture content of 3–30 wt. %.

25. The method for manufacturing biodegradable molded articles as set forth in claim 2, wherein low-frequency electroconductive heating is applied by placing the biodegradable material between a pair of electrodes and applying a low-frequency voltage between the electrodes.

26. The method for manufacturing biodegradable molded articles as set forth in claim 1, further comprising heating the biodegradable material by applying high-frequency dielectric heating to the biodegradable material.

27. The method for manufacturing biodegradable molded articles as set forth in claim 26, further comprising heating the biodegradable material by applying low-frequency frequency electroconductive heating to the biodegradable material after applying high-frequency electroconductive heating and high-frequency dielectric heating to the biodegradable material.

28. The method for manufacturing biodegradable molded articles as set forth in claim 26, wherein high-frequency electroconductive heating is applied before high-frequency dielectric heating.

29. The method for manufacturing biodegradable molded articles as set forth in claim 26, wherein high-frequency dielectric heating is applied before high-frequency electroconductive heating.

30. The method for manufacturing biodegradable molded articles as set forth in claim 2, wherein low-frequency electroconductive heating is applied to the biodegradable material after high-frequency electroconductive heating.

31. The method for manufacturing biodegradable molded articles as set forth in claim 2, wherein low-frequency electroconductive heating is applied to the biodegradable material prior to applying high-frequency electroconductive heating to the biodegradable material.

32. The method for manufacturing biodegradable molded articles as set forth in claim 26, further comprising applying low-frequency electroconductive heating to the biodegradable material prior to applying high-frequency dielectric heating and high-frequency electroconductive heating to the biodegradable material.

33. A method for manufacturing biodegradable molded articles comprising the steps of:

molding at least one biodegradable material; and heating the biodegradable material by applying high-frequency dielectric heating to the biodegradable material for an amount of time effective to yield a biodegradable molded article having a moisture content of 3–30 wt. %.

34. The method for manufacturing biodegradable molded articles as set forth in claim 33, wherein high-frequency dielectric heating is applied to the biodegradable material by placing the biodegradable materials in a high-frequency electric field.

35. The method for manufacturing biodegradable molded articles as set forth in claim 33, wherein the biodegradable material is heated for an amount of time effective to yield a biodegradable molded article having a moisture content of 5–20 wt. %.

36. The method for manufacturing biodegradable molded articles as set forth in claim 33, further comprising applying low-frequency electroconductive heating to the biodegradable material after applying high-frequency dielectric heating to the biodegradable material.

37. A method for manufacturing biodegradable molded articles comprising the steps of:

molding at least one biodegradable material;

heating the biodegradable material by applying high-frequency dielectric heating to the biodegradable material; and heating the biodegradable material by applying low-frequency electroconductive heating to the biodegradable material.

38. The method for manufacturing biodegradable molded articles as set forth in claim 37, wherein low-frequency electroconductive heating is applied to the biodegradable material prior to applying high-frequency dielectric heating to the biodegradable material.

39. The method for manufacturing biodegradable molded articles as set forth in claim 37, wherein low-frequency electroconductive heating is applied to the biodegradable material after applying high-frequency dielectric heating to the biodegradable material.

* * * * *